United States Patent [19]

Dworzecki

[11] Patent Number: 5,826,080
[45] Date of Patent: Oct. 20, 1998

[54] METHOD OF SCHEDULING SUCCESSIVE TASKS

[75] Inventor: Jozef Dworzecki, Fontenay Le Fleury, France

[73] Assignee: Cegelec, Levallois Perret, France

[21] Appl. No.: 510,343

[22] Filed: Aug. 2, 1995

[30] Foreign Application Priority Data

Aug. 11, 1994 [FR] France ................................ 94 09951

[51] Int. Cl.⁶ ............................ G06F 13/00; G06F 15/00
[52] U.S. Cl. ........................................................... 395/673
[58] Field of Search ..................................... 395/672, 673

[56] References Cited

PUBLICATIONS

"Fixed Priority Scheduling Periodic Tasks with Varying execution Priority" Harbor, et al, IEEE Comput. Soc. Press. Los Alamitos, CA. U.S.A. 1991, Dec. 4–6.

"An Optimal Algorithm for Guaranteeing Sporadic Tasks in Hard Real–Time Systems". IEEE Comput. Soc. Press, Los Alamitos, CA, USA 9–13 Dec. 1990.

Zhao et al, "Simple and Integrated Heuristic Algorithms for Scheduling Tasks with Time and Resource Constraints," Journal of Systems and Software, vol. 7, pp. 195–205, 1987.

Yuan et al, "A Decomposition Approach to Non–Preemptive Scheduling in Hard Real–Time Systems," Real–Time Systems Symposium, 1989, pp. 240–248.

Schwan et al, "Dynamic Scheduling of Hard Real–Time Tasks and Real–Time Threads," IEEE Trans. on Software Engineering, vol. 18, No. 8, Aug. 1992.

Al–Mouhamed, "Lower Bound on the Number of Processors and Time for Scheduling Precedence Graphs with Communication Costs," IEEE Trans. on Software Engineering, vol. 16, No. 12, Dec. 1990.

Stankovic et al, "The Spring Kernel: A New Paradigm for Real–Time Systems," IEEE Software, vol. 8, Issue 3, May 1991 pp. 62–72.

Lorts et al, "Empirical Evaluation of Weighted and Prioritized Static Scheduling Heuristic for Real–Time Multiprocessing Parallel and Distributed Real–Time Systems," Parallel and Distributed Real Time Systems Workshop; Apr. 28–29, 1994, pp. 58–63.

Saksena et al, "Temporal Analysis for Hard Real–Time Scheduling," Computers and Communications, 1993, International Phoenix Conference, pp. 538–544.

IEEE Transactions on Software Engineering, vol. SE–13, No. 5, May 1987, New York, US, pp. 564–576, Weis Zhao et al, "Scheduling Tasks with Resource Requirements in Hard Real–Time Systems".

Real Time Systems, vol. 1, No. 1, Jun. 1989, Dordrecht, NL pp. 27–60, Brinkley Sprunt et al, "A Periodic Task Scheduling for Hard–Real–Time Systems".

Proceedings of the IEEE, vol. 82, No. 1, Jan. 1994, New York, US, pp. 55–67, Krithi Ramamritham et al, "Scheduling Algorithms and Operating Systems Support for Real–Time Systems".

Proceedings of the Real–Time Systems Symposium, 2 Dec. 1986, New Orleans, USA, pp. 166–174; S. Cheng et al, "Dynamic Scheduling of Groups of Tasks with Precedence Constraints in Distributed Hard Real–Time Systems".

Primary Examiner—Kevin A. Kriess
Assistant Examiner—Alice Y. Park
Attorney, Agent, or Firm—Sughrue, Mion, Zinn, Macpeak & Seas, PLLC

[57] ABSTRACT

A method of scheduling tasks subject to timing and succession constraints essentially comprises grouping the tasks in layers according to succession constraints and scheduling the tasks layer by layer in increasing layer order up to the last layer, if possible, and then deciding that the resulting scheduling succeeds. If the scheduling achieved in a layer other than the first layer does not satisfy one or more constraints applying to a task belonging to the current layer, the method reschedules a layer containing a predecessor task corresponding to an unsatisfied constraint, schedules or reschedules all the other layers higher than the layer of the predecessor task, up to the last layer, if possible, and then decides that the resulting scheduling succeeds. Applications include scheduling of transmission of information on an industrial data bus.

2 Claims, 18 Drawing Sheets

PSi = X
PSi_1
PSj = Q

α

PSi = Q
PSi_1 = X

PSi = X
PSi_1
PSj = Q

β

PSi = Q
PSi_1 = X

METHOD OF SCHEDULING SUCCESSIVE TASKS

BACKGROUND OF THE INVENTION

1. Field of the Invention

The invention concerns a method of scheduling successive tasks by means of a computer by determining a task execution order and an execution start time for each task, no two tasks ever being executed simultaneously. This scheduling is based on a plurality of constraints that the tasks must satisfy. This process is more particularly concerned with applications in which there are two types of constraints:

sequence constraints: a task must be executed after one or more predetermined other tasks;

timing constraints: the execution of a task must begin at a time within at least one predetermined time interval. This interval is usually defined relative to the execution start time of a task that must immediately precede the task in question, or relative to an absolute time reference. A task immediately preceding the task in question is called the predecessor task. There is no limit on the number of predecessor tasks.

The method of the invention is applicable in particular to tasks that must be executed successively because they are executed by single means capable of executing only one task at a time, for example: a machine tool, a data bus, a team of workers. In the field of electronic data processing, the method can be applied to the management of a plurality of predetermined tasks to be executed successively in the same processor or on the same bus. In the field of industrial process control, the method can be applied in particular to the management of a so-called field bus used to transmit information successively in accordance with a predetermined series.

2. Description of the Prior Art

The prior art includes many scheduling methods:

so-called polynomial or critical path methods;

linear programming methods, especially the simplex method on which the PROLOG III language is based;

dynamic programming methods that can be applied only to relatively small problems; and heuristic methods that use some algorithms employing the above methods but further reduce the number of cases to be verified by simplifying certain constraints; the resulting solution is then less than optimal.

The prior art methods have two drawbacks: they require a long computation time since they systematically verify a very large number of permutations before giving a solution. The computation time is usually proportional to the factorial of the number of tasks to be scheduled.

To schedule repetitive tasks the prior art methods determine the duration of a macrocycle equal to the lowest common multiple of all the task periods and the duration of a microcycle equal to the highest common denominator of all the task periods, and then look for a permutation of the tasks such that all the constraints are satisfied simultaneously, trying out all possible permutations until one verifying this condition is found, the verification being carried out microcycle by microcycle. If a conflict appears within a microcycle the permutation currently being verified is abandoned and another is tried. The work done in connection with verification of that permutation during previous microcycles becomes of no utility since all the constraints previously satisfied are called into question again.

The prior art methods are therefore somewhat impractical for use in industrial applications.

An object of the invention is to propose a scheduling method that is free of these drawbacks so that a solution to a static scheduling problem is obtained faster, and also to enable dynamic scheduling problems to be handled, i.e. to make it possible to carry out rescheduling as and when the number of tasks to be scheduled and/or the constraints applying to those tasks change. Dynamic scheduling can be beneficial in scheduling machining tasks on a machine tool, for example, if the products to be manufactured are highly diverse; for scheduling aircraft take-offs and landings on a runway; for scheduling tasks on a data bus or processor; etc.

SUMMARY OF THE INVENTION

The invention consists in a method of scheduling successive tasks using a computer when some tasks must satisfy constraints whereby the time at which execution of the task starts must be within at least one predetermined time interval relative either to the execution start time of another, so-called predecessor task execution of which precedes that of the task in question or to an absolute reference time, which method comprises the steps of:

considering all the tasks to be repetitive, reducing the scheduling time interval to a microcycle the duration of which is equal to the highest common denominator of all the task repeat periods and looking for a schedule whereby if all the tasks are executed in the same microcycle they satisfy all the constraints;

grouping the tasks to be executed into layers in accordance with sequences imposed by the constraints;

scheduling the tasks layer by layer in order of increasing layer as far as the last layer, if possible, and in this case deciding that scheduling succeeds;

if no scheduling of the first layer satisfies all the constraints applying to the tasks of the first layer, stopping scheduling and deciding it fails and;

if the scheduling effected in a so-called current layer that is not the first layer does not satisfy one or more constraints applying to a task of the current layer:

rescheduling the highest layer of those layers containing the respective predecessor tasks corresponding to the unsatisfied constraints by shifting the execution time of the predecessor task contained in that layer in a direction and by an amount such that the unsatisfied constraint can be satisfied on subsequent rescheduling of the current layer;

then scheduling or rescheduling all other layers higher than the layer of the predecessor task, as far as the last layer, if possible, and then deciding that the resulting scheduling succeeds.

This method has the advantage of being faster than the prior art methods because:

1) The permutations are verified in a single microcycle;

2) If scheduling one layer of the succession graph fails, it reschedules one or more layers preceding the layer in question without calling into question again all of the work previously done.

These two features significantly reduce the computation time compared to the prior art methods which systematically explore all scheduling possibilities, calling into question again all the constraints that were satisfied previously if a permutation does not satisfy a constraint.

Finally, this method can be applied to scheduling a system in which a plurality of tasks can be executed in parallel, by dividing the system into a plurality of parallel subsystems in which the tasks must all be executed successively and applying the method of the invention to each of these subsystems.

The step of scheduling the tasks layer by layer can be effected using a prior art method such as the simplex algorithm, but a preferred method of scheduling each layer has been described in U.S. Pat. No. 5,606,695, which was filed as patent application Ser. No. 08/510,533 by the inventor of the present invention on Aug. 2, 1995. This method comprises the steps of:

calculating for each task of the current layer the upper and lower limits of the time interval in which execution of that task must start;

constructing a first series in which all the tasks of the current layer are scheduled in increasing order of their lower limit and are scheduled in increasing order of their upper limits when several tasks have a same lower limit;

constructing a second series in which all the tasks of the current layer are scheduled in increasing order of their upper limit and are scheduled in decreasing order of their lower limits when several tasks have a same upper limit and different lower limits;

constructing a current initial permutation, first by scheduling the tasks of the current layer in the order of the first series;

verifying if the current permutation satisfies all the constraints applying to the tasks of the current layer, the tasks being considered one by one in the order corresponding to said current permutation to check whether each task satisfies all the constraints applying to said task;

deciding that the scheduling of the current layer succeeds if all the constraints are satisfied;

otherwise, determining in the current permutation the first so-called ill-placed task for which a constraint is not satisfied;

determining in the second series a so-called candidate task immediately following the ill-placed task in that second sequence and which also precedes the ill-placed task in the current permutation, said candidate being a task which has already been verified, all the tasks following said candidate task in said current permutation being not considered as satisfying all the constraints, any more;

verifying that, if the candidate task is shifted to be immediately after the ill-placed task, all the constraints applying to all the tasks shifted in this way are then satisfied; and if at least one constraint is not satisfied, deciding that the candidate task is not suitable, then determining in the second sequence another candidate task and repeating the previous verification and, if this is not possible, deciding that the scheduling of the current layer fails;

if all the constraints are satisfied, deciding that the scheduling of the current layer succeeds.

This method has the advantage of being particularly fast since if the scheduling of a task of this layer fails it shifts one or more tasks in the same layer and preceding the task in question without systematically calling into question again all the constraints already satisfied in that layer and therefore without calling into question again all of the work previously done in that layer. This feature significantly reduces the computation time compared to any method that systematically explores all scheduling possibilities in that layer.

The method of the invention will be better understood and other features will emerge from the following description of one embodiment of the invention and the accompanying figures.

DETAILED DESCRIPTION OF THE PREFERRED EMBODIMENT

The method of the invention can be used for static or dynamic scheduling. Its reduction in computation time is particularly advantageous in dynamic scheduling, however, since it allows changing constraints and/or tasks to be dealt with in real time.

Figure 1:
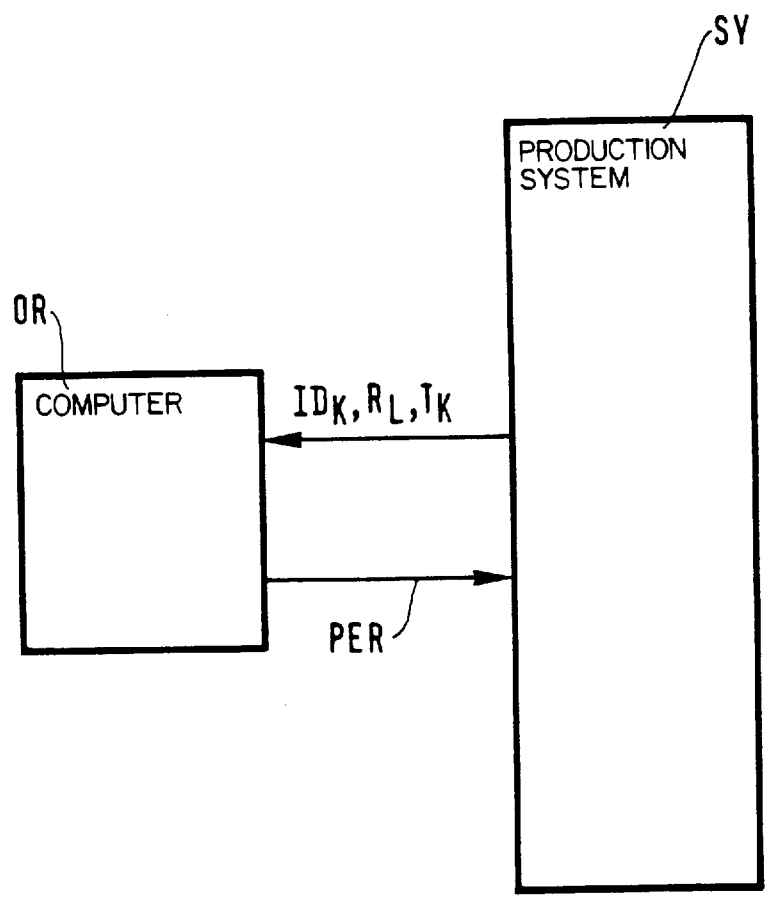
FIG. 1 shows the block schematic of a system in which the dynamic scheduling method of the invention is implemented.

FIG. 1 shows the block schematic of one embodiment of the device implementing the method of the invention for dynamic scheduling of industrial production tasks, for example.

The device includes a computer OR connected to a production system SY. The production system SY supplies to an input of the computer OR the parameters needed to determine a schedule: the identifier $ID_K$ of each task and, if appropriate, the period $T_K$ of each task and the definition $R_L$ of each constraint to be satisfied. These parameters are supplied each time that a change occurs in the nature of the task to be executed and/or in the constraints.

The computer then determines a new permutation PER and the production system SY then executes the tasks in accordance with that new permutation.

The tasks are usually executed by various devices of the system SY. The computer OR must be programmed to transmit to each device information indicating to it the times at which it can execute a task. The person skilled in the art will know how to program the computer OR to implement the method of the invention and to transmit information to each device, and this programming will not be described beyond the description of the method itself. Likewise, the person skilled in the art will know what hardware to use to connect a computer OR to a system SY comprising various devices adapted to execute respective different tasks.

Figure 2:
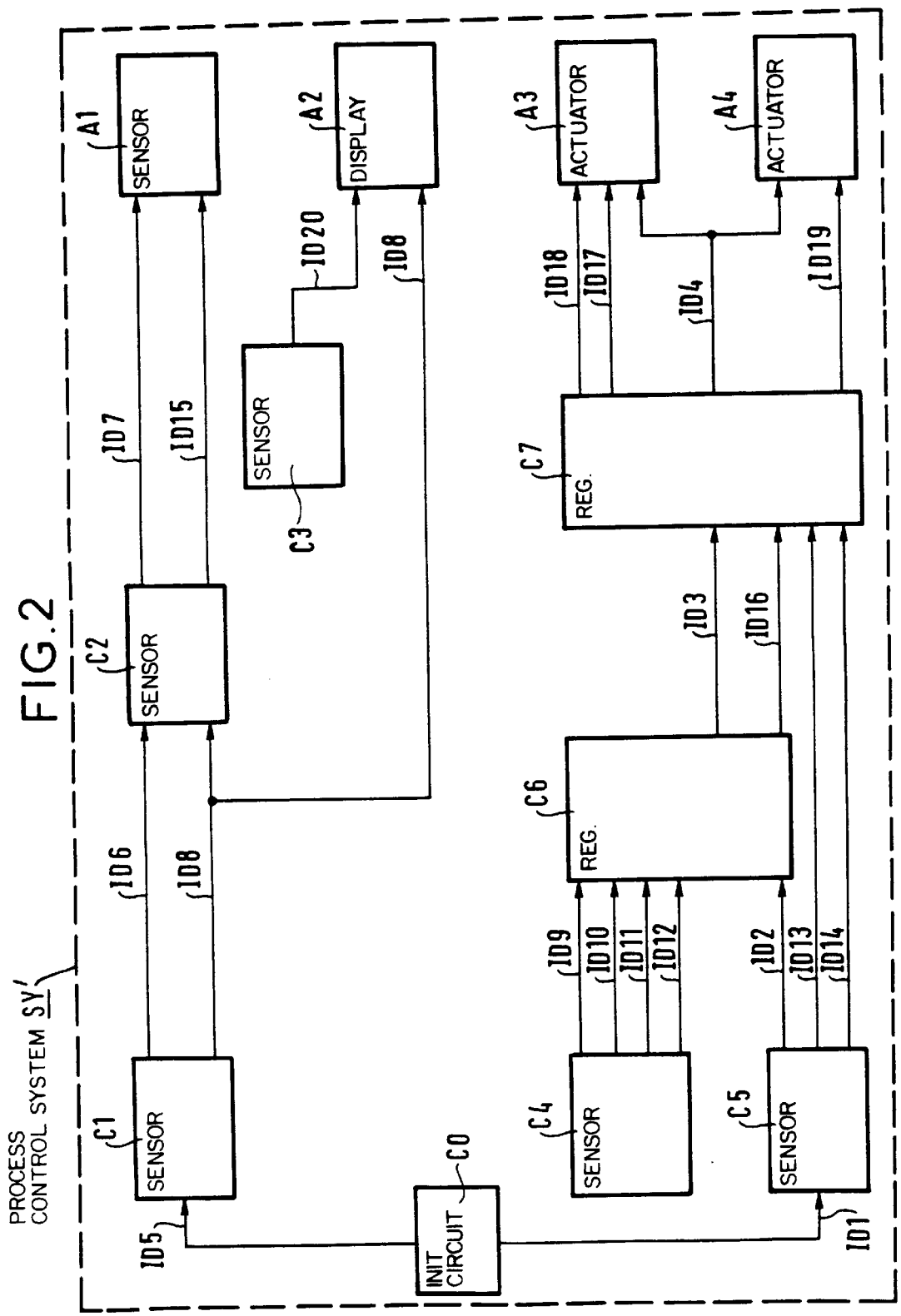
FIG. 2 shows the functional schematic of one embodiment of an industrial process control system requiring static scheduling.
Figure 3:
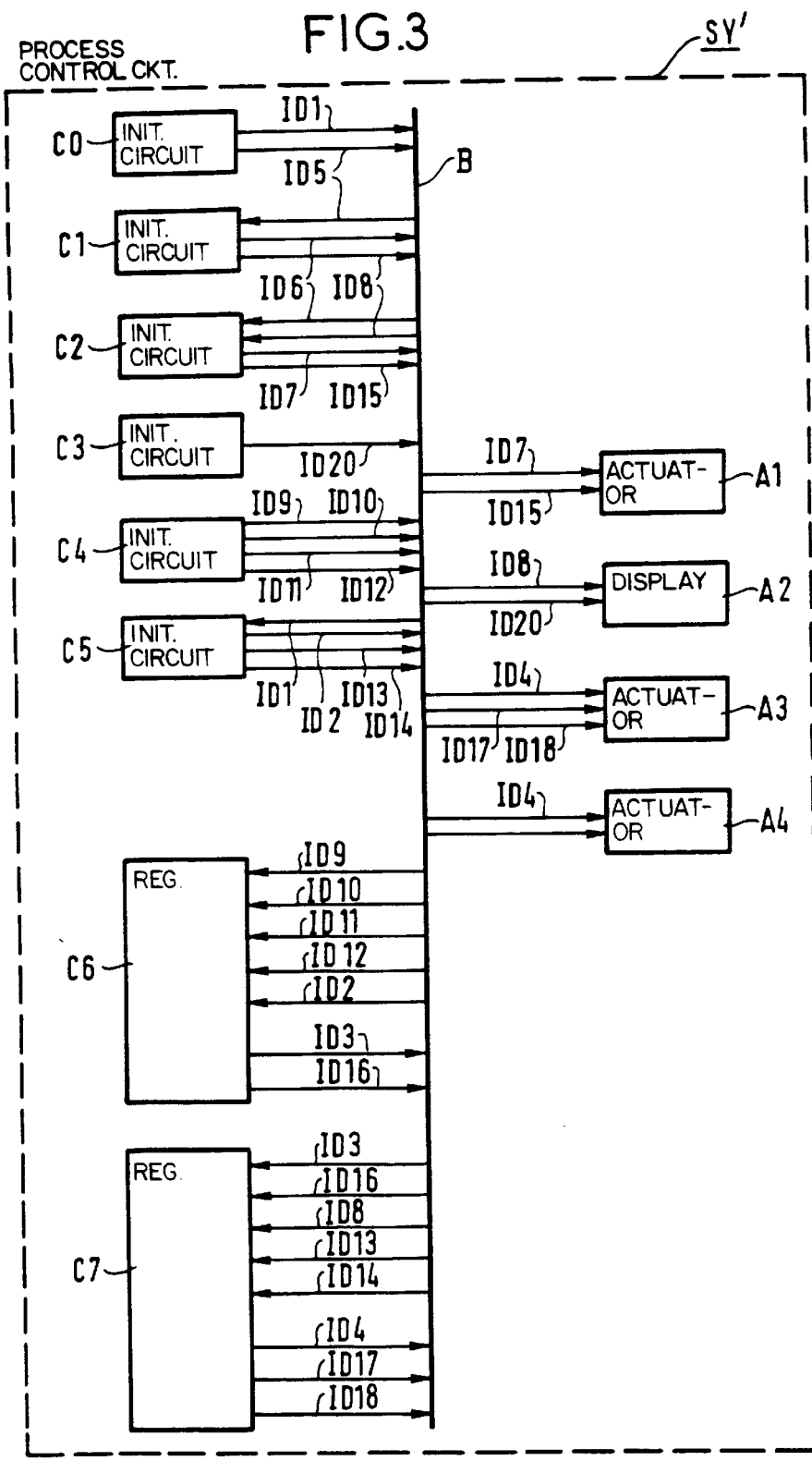
FIG. 3 shows the block schematic of this industrial process control system which includes a field bus on which information is transmitted successively in accordance with schedule determined by the method of the invention.

FIGS. 2 and 3 show an industrial process control system requiring static scheduling. This application is considered by way of example of one implementation as the method of the invention, but the invention is not limited to static scheduling applications. The same steps can be used for dynamic scheduling in real time.

FIG. 2 shows the functional schematic of an industrial control system SY'. Each task transmits information between a sender and receiver. The medium to be used can carry only one item of information at a time. The system SY' includes:

an initialization circuit C0;

sensors C1, . . . , C5;

regulator circuits C6 and C7;

actuators A1, A3, A4;

a display A2.

The exchange of information is shown by arrows. The initialization circuit C0 can send information ID1 and information ID5. Each of the sensors C1 through C5 is able to send information. The sensor C2 is able to send information ID7 and D15, for example. Some sensors are capable of receiving information. The sensor C2 is able to receive information ID6 or information ID8, for example.

The regulator circuits C6 and C7 are also able to send and to receive information. In this example the actuators A1, A3, A4 and the display A2 can only receive information. The actuator A1 is able to receive information ID7 and information ID15 sent by the sensor C2, for example. The same information can be received simultaneously by more than one system element. The information ID8 supplied by the sensor C1 is received simultaneously by the sensor C2 and by the display A2, for example.

FIG. 3 shows the block schematic of this system to show the physical links conveying the information ID1 . . . , ID20. All the information is conveyed by a single medium B which is a so-called field bus passing near each equipment.

The bus B cannot carry two items of information simultaneously. Each transmission constitutes a task that has to satisfy specific constraints. The problem therefore arises of scheduling the transmission, i.e. of determining the time at which each transmission must start, relative to an absolute reference time which is, for example, the time at which the system is initialized by the initialization circuit C0.

In this example each of the elements C0, . . . , C7, A1, . . . , A4 operates with a repeat period. These periods are respectively, for example: 200 ms, 200 ms, 500 ms, 400 ms, 40 ms, 40 ms, 40 ms, 200 ms, 400 ms, 40 ms, 40 ms. The system therefore operates in a macrocycle having a duration equal to the lowest common multiple of these periods, which is 400 ms.

In this example each task transmits one item of information and has a uniform duration of 0.4 ms, regardless of the number of addressees of that information. Also, these transmission tasks must satisfy the constraints R1 through R33 listed below:

R1) ID1 delay [0;400]

R2) ID13 after ID1 [2;40]

R3) ID14 after ID1 [2;40]

R4) ID2 after ID1 [2;40]

R5) ID2 after ID9 [0;40]

R6) ID2 after ID10 [0;40]

R7) ID2 after ID11 [0;40]

R8) ID2 after ID12 [0;40]

R9) ID9 delay [0;400]

R10) ID10 delay [0;400]

R11) ID11 delay [0;400]

R12) ID12 delay [0;400]

R13) ID3 after ID2 [7;40]

R14) ID16 after ID2 [7;40]

R15) ID3 after ID16 [0;40]

R16) ID3 after ID13 [0;40]

R17) ID3 after ID14 [0;40]

R18) ID3 after ID8 [0;40]

R19) ID17 after ID3 [7;40]

R20) ID18 after ID3 [7;40]

R21) ID19 after ID3 [7;40]

R22) ID4 after ID3 [7;40]

R23) ID4 after ID17 [0;40]

R24) ID4 after ID18 [0;40]

R25) ID4 after ID19 [0;40]

R26) ID5 delay [0;400]

R27) ID6 after ID5 [102;200]

R28) ID8 after ID5 [102;200]

R29) ID6 after ID8 [0;200]

R30) ID15 after ID6 [16;200]

R31) ID7 after ID6 [16;200]

R32) ID7 after ID15 [0;200]

R33) ID20 delay [0;400]

For example, constraint R26) ID5 delay [0;400] requires that transmission of the information ID5 supplied by an output of the initialization circuit C0 start between 0 and 400 ms after an absolute time reference that is the initialization time as defined by the circuit C0 and which starts a macrocycle.

The constraint R27) ID6 after ID5 [102;200] requires that transmission of the information ID6 supplied by the sensor C1 start between 102 ms and 200 ms after the time at which transmission of the information ID5 starts.

Each constraint applies only to the transmission start time, which must be within the indicated interval $[t_{min}, t_{max}]$. Transmission can continue beyond the limit of that interval, it must merely respect the fixed duration.

The set of constraints R1, . . . , R33 that apply to the tasks which transmit the information ID1, . . . , ID20 can be represented by a graph called a succession graph in which each node represents a task and each line joining two nodes represents a constraint. Each line is oriented from a so-called predecessor node to a node corresponding to the task to which the constraint applies, and which must therefore be executed after the so-called predecessor task corresponding to the predecessor node.

A preliminary step of the method of the invention reduces the number of permutations to be verified by verifying the scheduling of tasks only during a microcycle which is the highest common denominator of all the task repetition periods. If a permutation is found such that if all the tasks are executed within the same microcycle and satisfy all the constraints, then that permutation will not lead to any conflict during any of the microcycles constituting a macrocycle, since the worst case scenario is that in which all the tasks occur in the same microcycle because multiples of their periods coincide.

Figure 4:
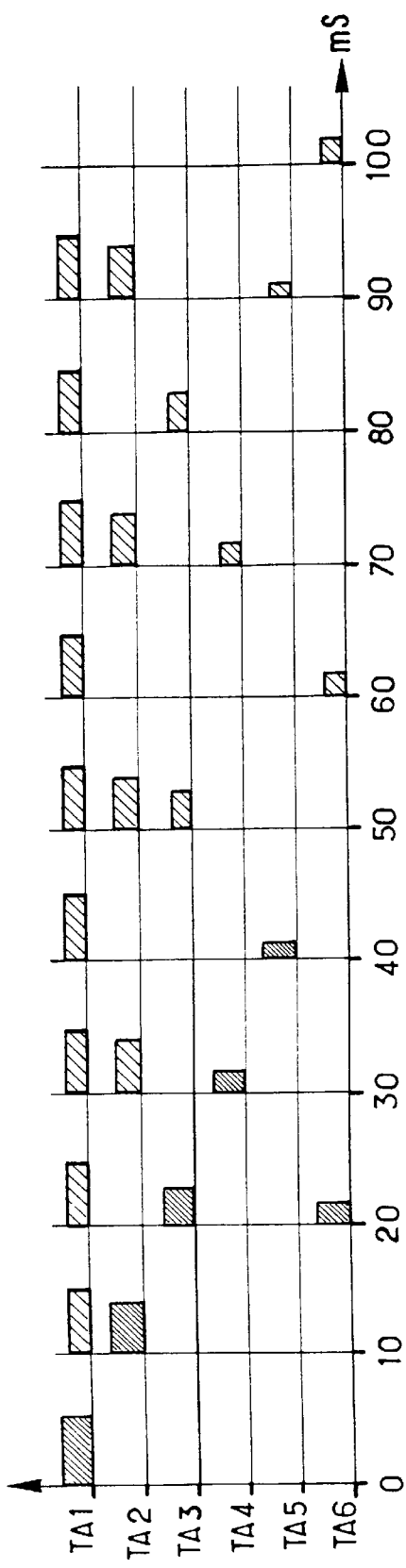
FIGS. 4 and 5 show one step of the method of the invention to allow for the periodic nature of certain tasks.
Figure 5:
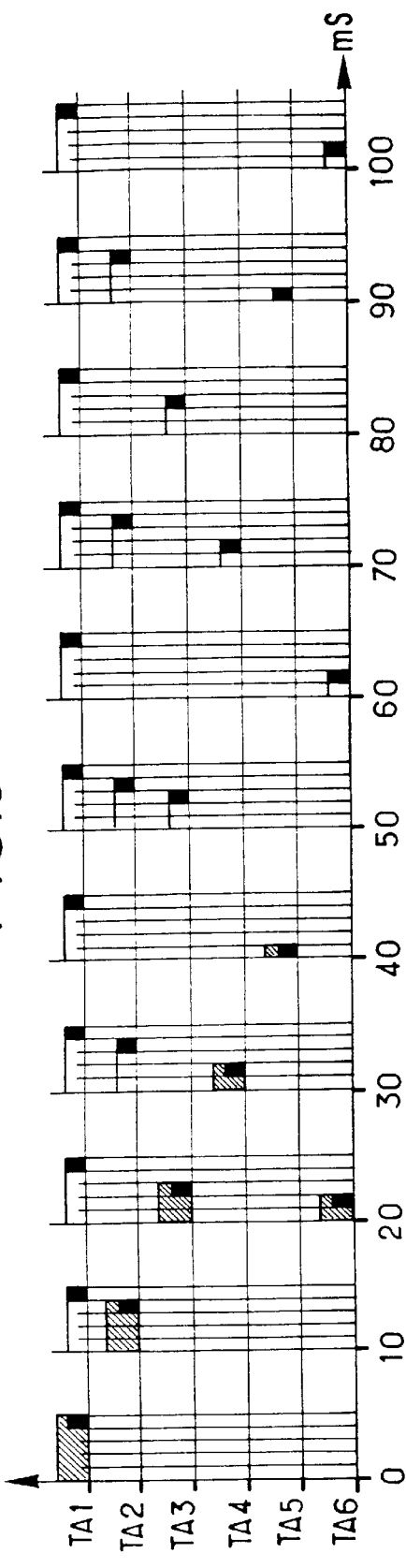

FIG. 4 and 5 shows this preliminary step of the method of the invention. Note that in the case where one or more tasks are not to be regarded a priori as repetitive, it is sufficient to assign them an arbitrary common period, but one that facilitates the determination of a microcycle. It is therefore sufficient to determine the value of the highest common denominator of the period of the repetitive tasks and then to choose a multiple of that value to constitute common periods for all the non-repetitive tasks.

FIGS. 4 and 5 relate to the example in which six periodic tasks T1 through T6 with respective periods of 10 ms, 20 ms, 30 ms, 40 ms, 50 ms and 40 ms have to be scheduled. The execution time is the same for all the tasks and is equal to 1 ms.

In FIG. 4 the time intervals [$t_{min}$, $t_{max}$] for each task are shown cross-hatched.

These intervals are as follows:

| | |
|---|---|
| TA1 [$t_{min}$, $t_{max}$]= | [0, 4 ms] modulo 10 ms |
| TA2 | [10, 13 ms] modulo 20 ms |
| TA3 | [20, 23 ms] modulo 30 ms |
| TA4 | [30, 32 ms] modulo 40 ms |
| TA5 | [40, 41 ms] modulo 50 ms |
| TA6 | [20, 22 ms] modulo 40 ms |

These tasks have a macrocycle equal to the lowest common multiple of their combined periods, which is 600 ms. A macrocycle can be divided into 60 microcycles each of 10 ms. Two repetitive tasks can be in conflict if they have to be executed during the same microcycle. For example, the tasks TA1, TA3 and TA6 must be executed during the same microcycle [20 ms, 30 ms] then [140 ms, 150 ms], etc.

To determine a schedule that suits the worst case scenario, it is sufficient to consider a microcycle in which all tasks without exception must be executed once. In practise, the tasks do not all occur in the same microcycle. An imaginary case in which this event occurs is considered below.

Time shifting can shift the execution time of each task into the interval of the same microcycle [0, 10 ms]. It is defined by the formula:

$$t_{st}^{Kimag} = t_{st}^{K} - k.PGCD$$

where $t_{st}^{Kimag}$ is the imaginary, or theoretical, execution start time of a task K;

$t_{st}^{K}$ is the real execution start time of the task K;

PGCD is the duration of a microcycle, i.e. the highest common denominator of the periods; and k is an integer such that the imaginary execution start time $t_{st}^{Kimag}$ of the task K is shifted into the required microcycle, in this instance the microcycle [0, 10 ms].

The interval [$t_{min}^{K}$, $t_{max}^{K}$] defined by all the constraints applying to the task K is therefore also shifted by -k.PGCD.

The scheduling method of the invention is then applied in this interval [0, 10 ms]. When a permutation satisfying all the constraints has been determined, the actual execution times $t_{st}^{K}$ are deduced from the imaginary execution start times using the formula:

$t_{st}^{K} = t_{st}^{Kimag} + k.PGCD$ modulo the period of the task K.

FIG. 5 shows the resulting scheduling of the tasks over the interval 0 to 100 ms, the interval 100 ms to 600 ms not being shown but being scheduled in a similar way. Each execution interval is shown in black. Consider, for example, the interval 20 ms to 30 ms in which there can be conflict between the tasks TA1, TA3 and TA6. The task TA1 is executed in the interval 24 ms to 25 ms. The task TA3 is executed in the interval 22 ms to 23 ms. The task TA6 is executed in the interval 21 ms to 22 ms. Thus TA1 and TA3 or TA6 are never executed simultaneously, regardless of the microcycle in question, which is one of the 60 microcycles constituting the macrocycle [0, 600 ms].

In an application in which some tasks can be executed simultaneously, this preliminary step further consists in grouping the tasks into a plurality of independent graphs, if possible, each graph containing only tasks related by constraints. Scheduling a plurality of graphs independently is faster than scheduling a single more complex graph.

Figure 6:
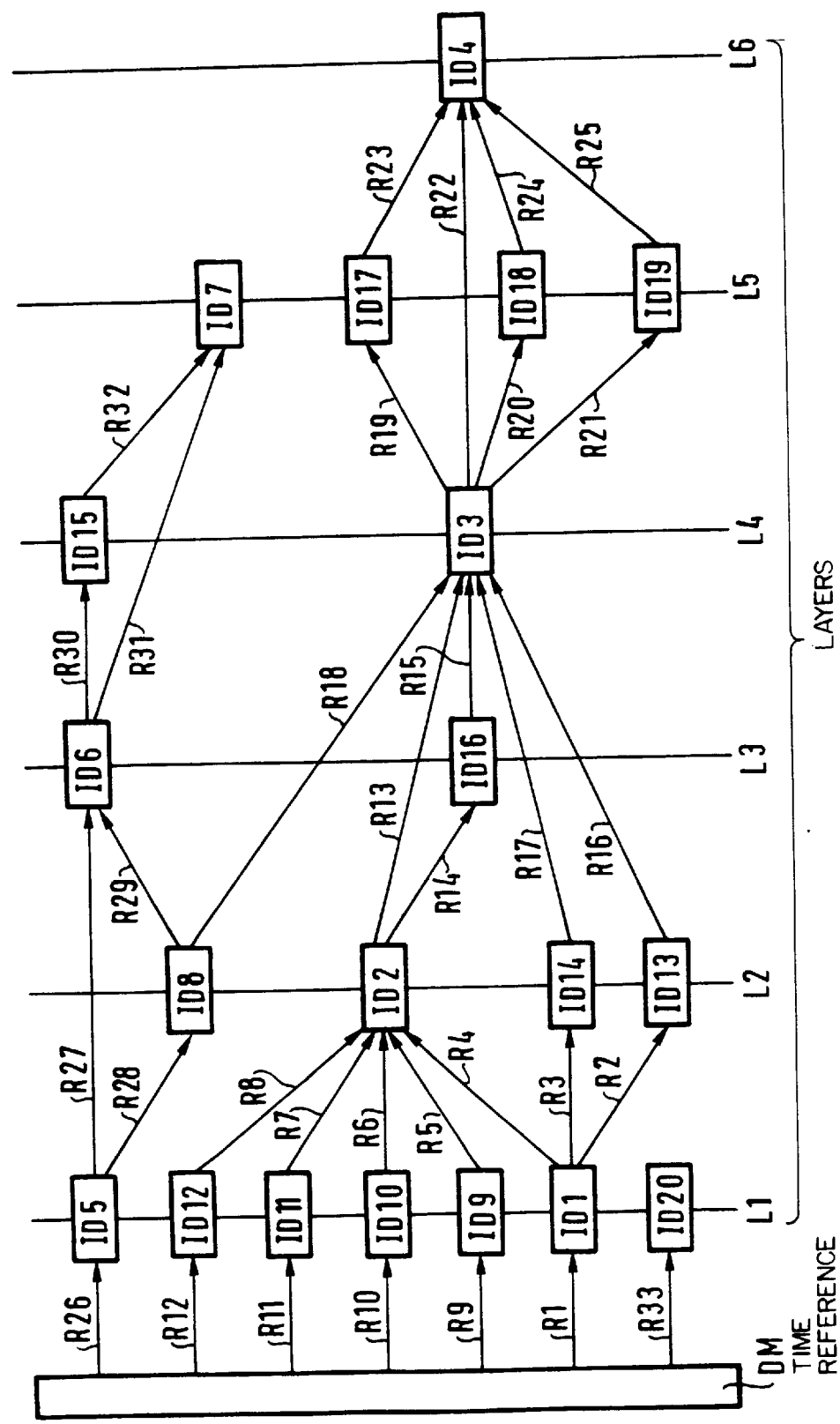
FIG. 6 shows a succession graph determined for the system shown by way of example in FIGS. 2 and 3.

In the example shown in FIG. 6, the tasks cannot be simultaneous and there is therefore only one succession graph.

For each graph the method of the invention consists firstly in grouping the tasks into layers such that:

each task belongs to only one layer of the graph;

a given task belongs to a layer K>2 if all the predecessor tasks of that task belong to layers below layer K and if at least one of the predecessor tasks belongs to layer K−1.

FIG. 6 shows the succession graph for the tasks effected in the system shown in FIGS. 2 and 3. The nodes corresponding to the tasks are grouped into six successive layers L1 through L6. The constraints R26, R12, R11, R10, R9, R1, R33 are timing constraints relative to an absolute reference time DM which is the start of the microcycle. The layer L1 comprises the nodes representing the tasks which transmit the information IDS, ID12, ID11, ID10, ID9, ID1, ID20. The layer L2 comprises the nodes corresponding to the tasks which transmit the information ID8, ID2, ID14, ID13. The layer L3 comprises the nodes corresponding to the tasks which transmit the information ID6 and ID16. The layer L4 comprises the nodes corresponding to the tasks which transmit the information ID15 and ID3. The layer L5 comprises the nodes corresponding to the tasks which transmit the information ID7, ID17, ID18, ID19. The layer L6 contains only the node corresponding to the task which transmits the information ID4.

The method of the invention determines a schedule layer by layer, successively in the order of increasing position L1, L2, . . . , L6 corresponding to the sequence imposed by the constraints.

Figure 7:
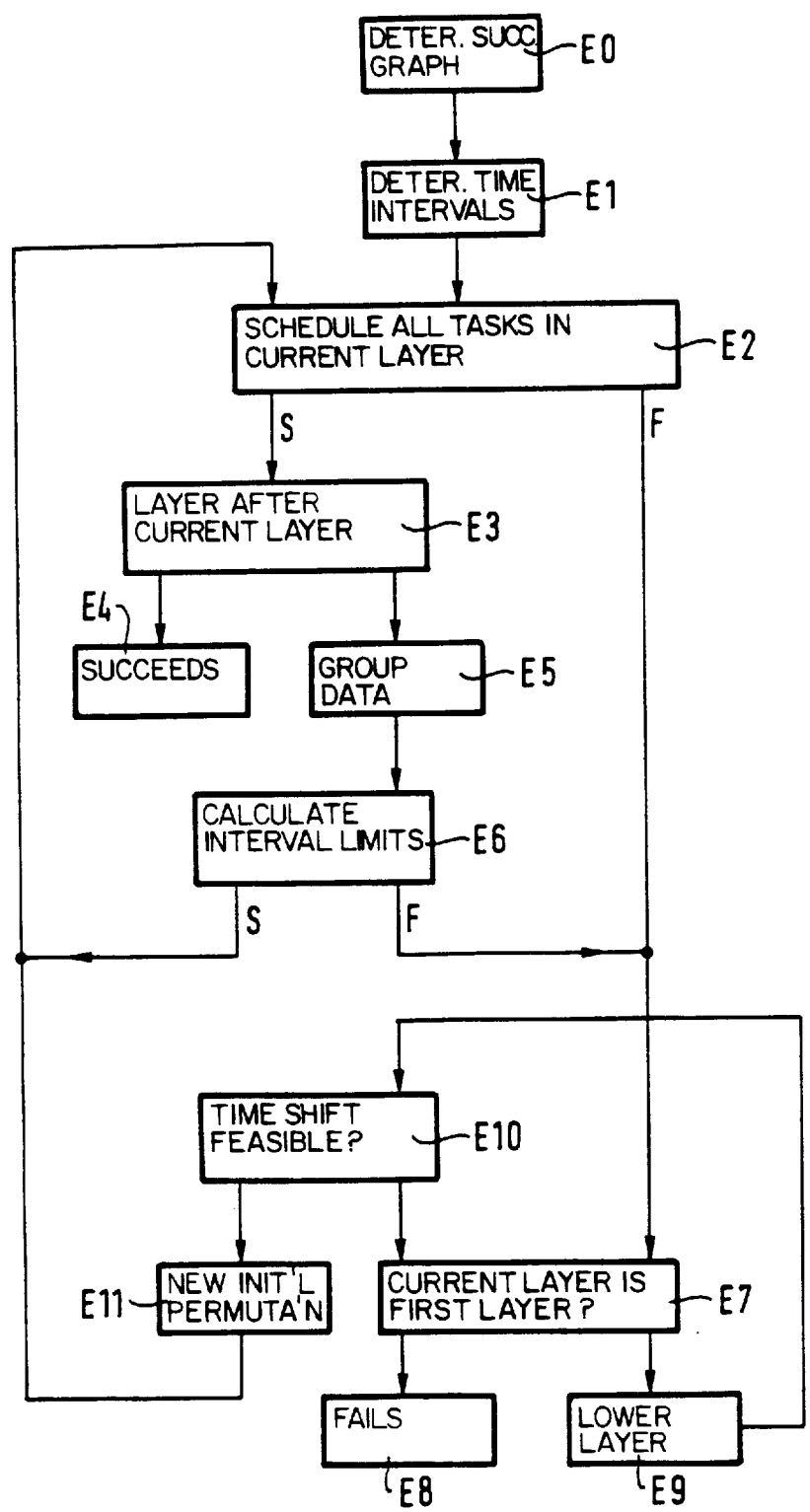
FIG. 7 shows the flowchart for one embodiment of the method of the invention.

FIG. 7 shows the flowchart of one embodiment of the method of the invention. A preliminary step E0 determines the succession graph arising from the constraints that apply to the tasks to be scheduled, i.e. groups the tasks into a number of subsets constituting the layers of the graph in accordance with the sequences imposed by the constraints. The specific case in which there are repetitive tasks is described below.

The list of constraints is scanned a first time. Each task is assigned to a first layer if it is subject only to timing constraints relative to an initialization time. Each task is assigned to a second layer if it is subject to at least one sequence constraint such that it must execute after a task assigned to layer 1 and if it is not subject to any sequence constraint such that it must execute after a task that has not yet been assigned to any layer and which therefore belongs to a layer above layer 1, for example layer 2.

The layers are constructed in increasing order, repeating the scanning of the list of constraints and eliminating from this list the constraints applying to the tasks that have been assigned to a layer.

Any task is assigned to the layer i>1 if it is subject to at least one sequence constraint such that it must execute after a task that has been assigned to the layer i−1 and if it is not subject to any sequence constraint such that it must execute after a task that has not yet been assigned. When all of the list of constraints has been scanned and there remain tasks not yet assigned, then i is incremented and the list of constraints is scanned again until all of the tasks have been assigned.

A first step E1 determines the time intervals in which execution of the tasks constituting the first layer of the graph must start. The limits of each of these time intervals are given directly by the values of the parameters of a timing constraint. It is therefore not necessary to calculate the absolute value of the times which delimit the time intervals for the first layer.

Step E2 schedules all the tasks belong to a layer called the current layer, verifying that the schedule is compatible with any scheduling done previously for other layers. Step E2 is repeated for layers other than the first layer, as will become clear below. Step E2 is described in detail below, with reference to FIG. 13.

If step E2 succeeds (S) step E3 determines if there is a layer after the current layer. If there is no next layer, step E4 concludes that scheduling of all the tasks of the graph in question has succeeded. If there is a next layer, it becomes the current layer and step E5 groups the data constituting the constraints applying to the tasks constituting this next layer.

Step E6 then calculates the limits of the time intervals $[t_{min}, t_{max}]$ in which execution of the tasks constituting the current layer must start. This calculation is described below with reference to FIG. 8. If the calculation of a time interval for each task succeeds (S) step E2 is repeated to schedule the tasks belonging to the current layer. If the calculation of at least the time interval for at least one task yields an empty interval, step E6 fails (F). This situation is described below with reference to FIG. 4. A test E7 then determines if the current layer is the first layer.

If it is the first layer, step E8 concludes that the scheduling has failed, so that it is not possible to modify anything upstream of the first layer. If the current layer is not the first layer, step E9 determines a layer below the current layer in which the scheduling will be modified to remedy the failure of scheduling in the current layer. The layer determined by step E9 becomes the current layer. The test E7 is also carried out if the scheduling of the current layer by step E2 fails (F). In this case there is an incompatibility between the intervals $[t_{min}, t_{max}]$ of at least two tasks of the current layer. This is not the same type of conflict as in the case of failure in step E6, but it also requires rescheduling of at least one layer below the current layer.

Step E9 determines that layer by considering which constraints are not satisfied. For each of these constraints there is a predecessor task which belongs to a layer that has been scheduled previously. If there is more than one constraint that is not satisfied, step E9 determines for each of them the layer containing the predecessor task and then determines which of these layers is the highest layer, in order to minimize the number of layers to be rescheduled.

For the unsatisfied constraint corresponding to the layer determined in this way step E9 determines the direction and amount of a shift in the execution start time of that predecessor task such that the unsatisfied constraint could be satisfied during subsequent rescheduling of the current layer.

Step E10 then verifies if it is possible to achieve the time shift determined by step E9 by modifying the permutation determined previously by step E2 in respect of the layer determined by step E9.

If step E10 determines that it is possible to apply this time shift by modifying the permutation determined for the layer determined by step E9, step E11 determines a new initial permutation by making this modification.

After step E11, step E2 is repeated to reschedule the current layer from the new initial permutation.

If step E10 determines that it is not possible to obtain this time shift by modifying the initial permutation, the layer determined by step E9 fails. Test E7 then determines if the layer determined by step E9 was the first layer or not. If it was the first layer, step E8 decides that scheduling of the graph as a whole fails. If it was not the first layer, step E9 is repeated to determine another layer in which scheduling will be repeated on the basis of a modified initial permutation.

Step E9 looks for a layer to modify, considering the layers corresponding to unsatisfied constraints in decreasing order from the current layer. Step E9 determines the layer at which the scheduling procedure E2 must be restarted from a new initial permutation, allowing for the nature of the conflict which prevented success of scheduling in the layer in question. If this is a conflict between a task of the current layer and another task of the same layer, step E9 proposes modification of the permutation for the scheduling procedure of the current layer. If it is a conflict between a task of the current layer and a task of one of the layers scheduled previously, it determines which layer that was, from the identity of the task in conflict with the task of the current layer: in this case a new permutation constitutes the initial permutation.

Figure 8:
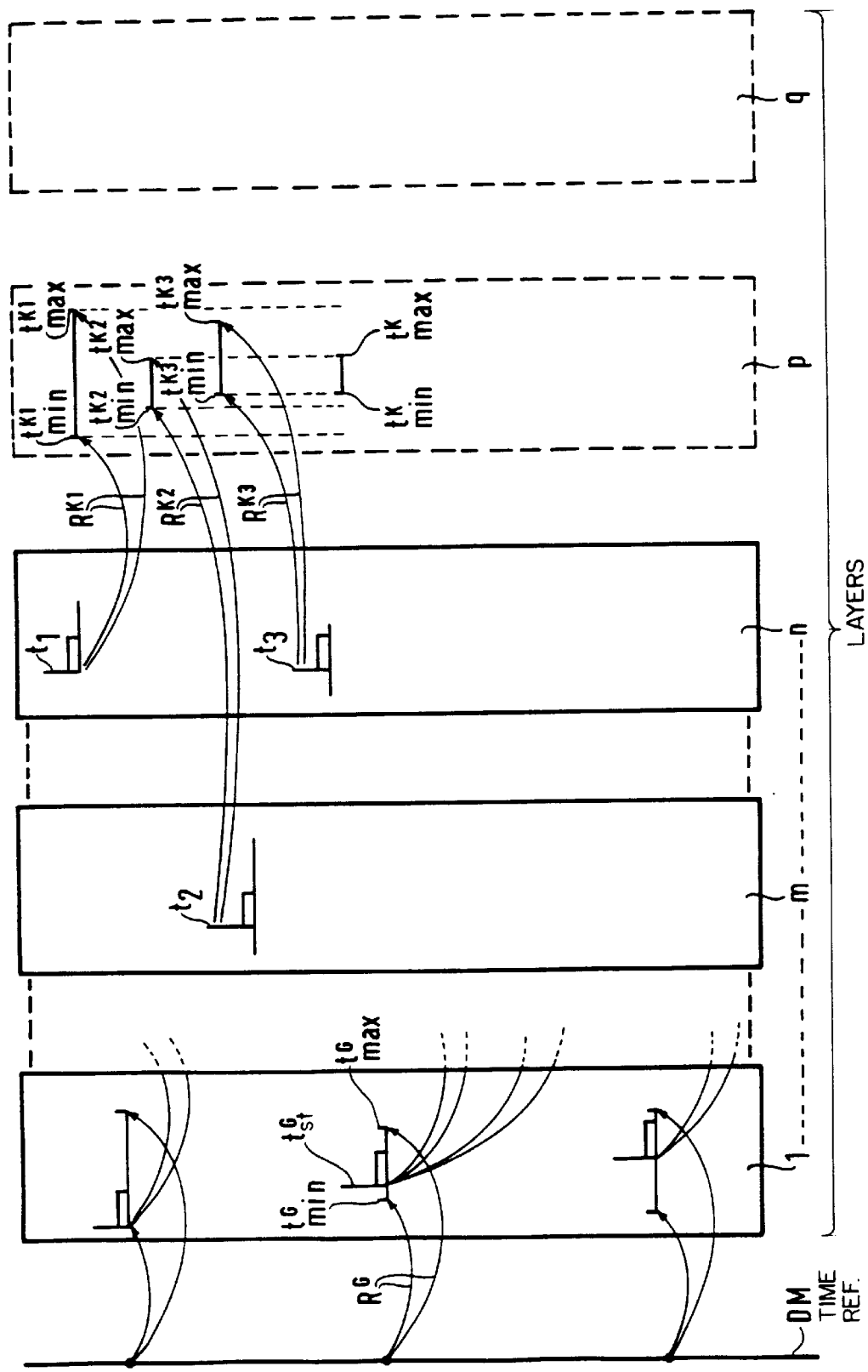
FIG. 8 shows a first step of the flowchart from FIG. 7.

FIG. 8 shows steps E1 and E6 of the scheduling method. It shows the start DM of the macrocycle of a graph such as that shown in FIG. 6 comprising layers 1, . . . m, . . . n, p. g. Each of the task of layer 1 is subject to a single timing type constraint referenced to the macrocycle start DM. For example, task G must satisfy a constraint $R^G$ whereby the time $t^G_{st}$ at which execution of task G starts must be in an interval $[t^G_{min}, t^G_{max}]$. The time $t^G_{st}$ can be coincident with the upper limit $t^G_{max}$. In FIG. 8 a small black rectangle shows the time interval occupied by execution of the task.

For each task other than those of the first layer, one or more after constraints can require that the execution start time of that task is in a given time interval relative to a predecessor task. Consider a task K in layer p, for example. Layers 1, . . . , m, . . . , n are assumed to have been scheduled previously. Layer p is currently being scheduled and layer g has not yet been scheduled. Task K must satisfy three after constraints $R^{K1}, R^{K2}, R^{K3}$. The constraint $R^{K1}$ requires that execution of task K start in a time interval defined by two time values referenced to the time $t_1$ at which execution of a given task in layer a starts. The constraint $R^{K2}$ requires that execution of task K start in an interval defined by two time values referenced to the time $t_2$ at which execution of a given task in layer m starts. The constraint $R^{K3}$ requires that execution of task K start at a time in an interval defined by two time values referenced to the time $t_3$ at which execution of a given task in layer n starts.

The after constraints have values such that there cannot be any overlap between the execution interval of the predecessor task and the execution interval of the task subject to the constraint in question. Given these conditions, if the scheduling of a layer satisfies all the constraints applying to the tasks of that layer, it is not necessary to verify that the scheduling also satisfies other constraints applying to lower layers.

Step E6 determines the absolute limits referenced to the macrocycle start time DM of each of these three intervals. It accordingly determines three intervals $[t^{K1}_{min}, t^{K1}_{max}]$ $[t^{K2}_{min}, t^{K2}_{max}]$ and $[t^{K3}_{min}, t^{K3}_{max}]$. The task K must satisfy the three constraints $R^{K1}, R^{K2}, R^{K3}$ simultaneously and so execution of task K must start in an interval $[k^K_{min}, t^K_{max}]$ which is obtained by applying the AND operator to these three intervals. If this is not possible, it is necessary to call into question again the scheduling of at least one of the layers m and n linked to task K by the constraints $R^{K1}, R^{K2}$ and $R^{K3}$. By modifying the scheduling of layer n it is possible to modify the relative positions of the times $t_1, t_3$ of starting execution of tasks linked to task K by the constraints $R^{K1}$ and $R^{K3}$. It is also possible to modify the position of $t_2$ relative to $t_1$ and $t_3$ by rescheduling layer m, but it is preferable to give priority to rescheduling higher layers, i.e. layer n in this example.

If a layer is rescheduled it is necessary to reschedule all higher layers that may have been scheduled previously. In the example shown in FIG. 8, if rescheduling starts in layer m it is necessary to reschedule layers m+1, . . . , n. It is therefore preferable to start rescheduling in the highest possible layer. In this example it is preferable to start rescheduling in layer n rather than in layer m.

If the rescheduling of layer n makes the constraints $R^{K1}$, $R^{K2}$, $R^{K3}$ mutually compatible, i.e. if it determines a non-empty interval $[k^K_{min}, t^K_{max}]$, then the number of layers in which rescheduling is needed is restricted to 1.

When step E6 has succeeded in determining an interval $[t^K_{min}, t^K_{max}]$ for each task of the layer p in question, then step E2 schedules those tasks.

FIGS. 9 through 12 show the basic principles of the method applied in step E2. This procedure schedules all the tasks in the same layer, minimizing the number of permutations to be verified. This procedure succeeds if it determines a permutation constituting a schedule satisfying all the constraints applying to the tasks in this layer.

Figure 9:
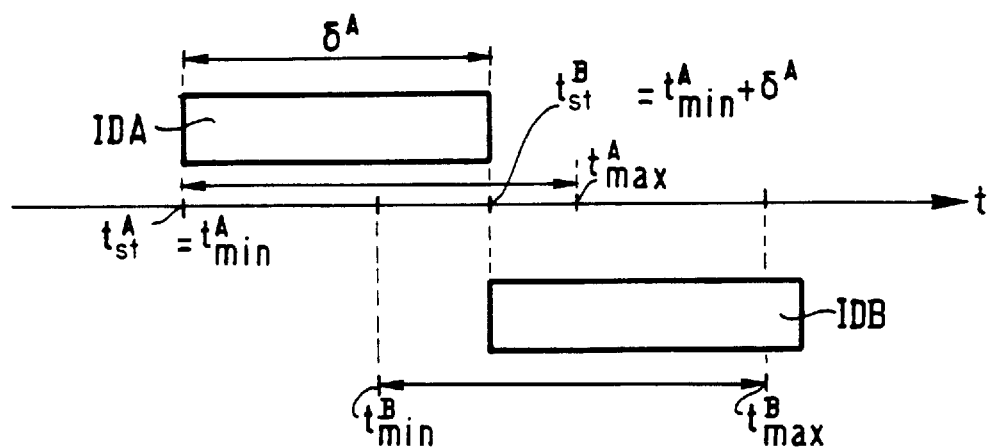
FIGS. 9 through 12 show the basic principles of scheduling tasks within a layer of the succession graph, in accordance with the invention.

FIG. 9 shows a timing diagram illustrating a first basic principle of the method of the invention for scheduling tasks in the same layer. This first basic principle imposes priority execution of tasks for which the time interval starts the soonest, i.e. with the smallest value $t_{min}$. In practise the initial permutation of the tasks, i.e. the first permutation to be verified, is constituted by a series MIN-SERIES, in which the tasks are arranged in increasing order of their $t_{min}$ values.

The rectangles IDA and IDB in FIG. 9 show time intervals respectively assigned to the execution of a task A and to the execution of a task B. Constraints require that execution of task A start within an interval $[t^A_{min}, t^A_{max}]$ or, at worst, at time $t^A_{max}$. They require that execution of task B start within an interval $[t^B_{min}, t^B_{max}]$ or, at worst, at time $t^B_{max}$, In this example $t^A_{min}$ is before $t^B_{min}$. The first basic principle is to execute task A first, shifting the interval in which this execution occurs as close as possible to the lower limit $t^A_{min}$; then executing task B during an interval IDB starting as close as possible to the lower limit $t^B_{min}$ without overlapping the interval IDA. In this example the interval IDA has a duration $\delta_A$ which overlaps the interval $[t^B_{min}, t^B_{max}]$ and consequently the intervals IDA and IDB will be as close together as possible by choosing:

$$t^B_{st} = t^A_{min} + \delta^A$$

Figure 10:
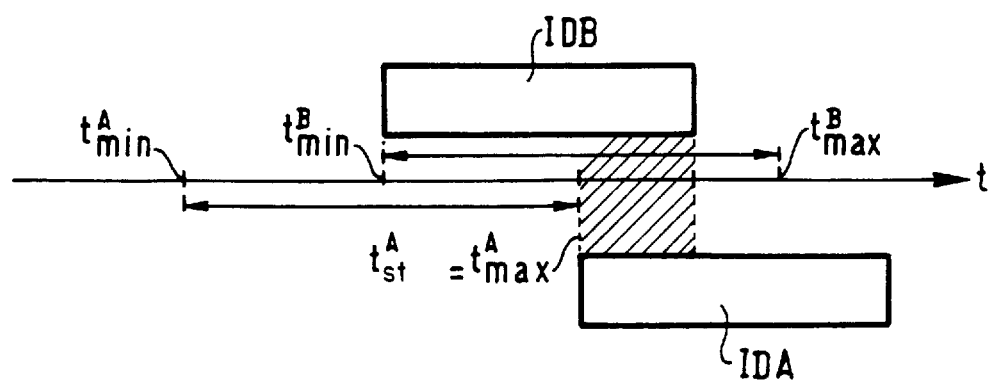

FIG. 10 shows, for the same example, the consequences of failure to apply this basic principle, i.e. of having task B executed before task A. The execution interval IDB then starts as soon as possible, i.e. at the lower limit of the interval $[t^B_{min}, t^B_{max}]$, The execution interval IDA should start after the end of the execution interval IDB in order not to overlap the interval IDB, but in the example the execution interval IDB has a length such that it goes beyond the upper limit $t^A_{max}$ of the interval in which starting execution of task A is permitted. At best, task A could start at time $t^A_{st} = t^A_{max}$, but then the two execution intervals IDB and IDA overlap. The overlap area is cross-hatched in FIG. 10.

The example thus shows that failing to respect the first basic principle increases the probability that some constraints will not be satisfied.

Figure 11:
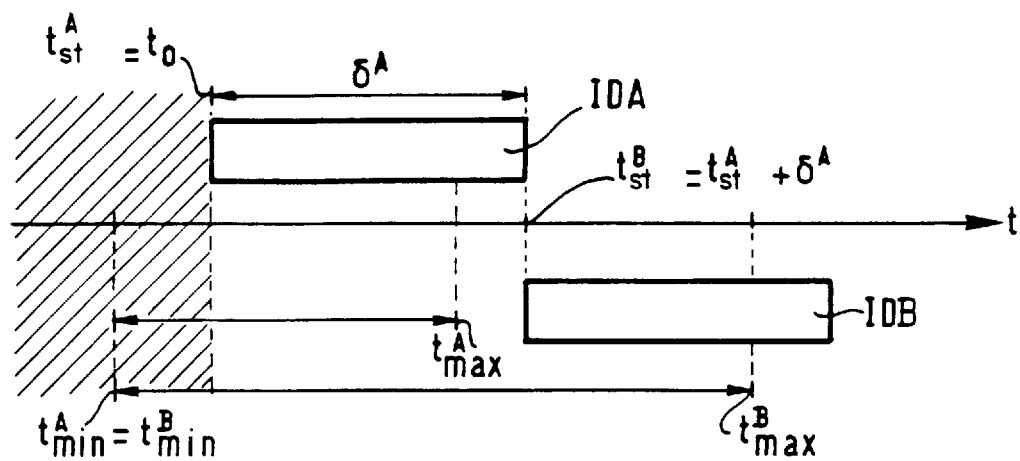

FIG. 11 shows a timing diagram illustrating a second basic principle of the method of the invention for scheduling tasks in the same layer. This basic principle chooses the task to be given execution priority from a plurality of tasks for which the lower limit $t_{min}$ has the same value. In this case, this second basic principle imposes priority execution of the task for which the upper limit $t_{max}$ has the smallest value.

In example shown in FIG. 11, two tasks A and B have the same lower limit $t^A_{min} = t^B_{min}$ for the time interval in which execution must start. Constraints imposed by the existence of other execution intervals that are not shown prohibit execution of tasks A and B before a time $t_0$ after $t^A_{min} = t^B_{min}$, in a time interval shown cross-hatched. Thus the execution intervals IDA and IDB can only start from this time $t_0$. The upper limit $t^B_{max}$ for task B is greater than the upper limit $t^A_{max}$ for task A. In accordance with the second basic principle, task A takes priority for execution. Task B is then executed from a time:

$$t^B_{st} = t^A_{min} + \delta^A$$

Thus the two execution intervals IDA and IDB occur one after the other with no particular problem due to the upper limit $t^B_{max}$.

Figure 12:
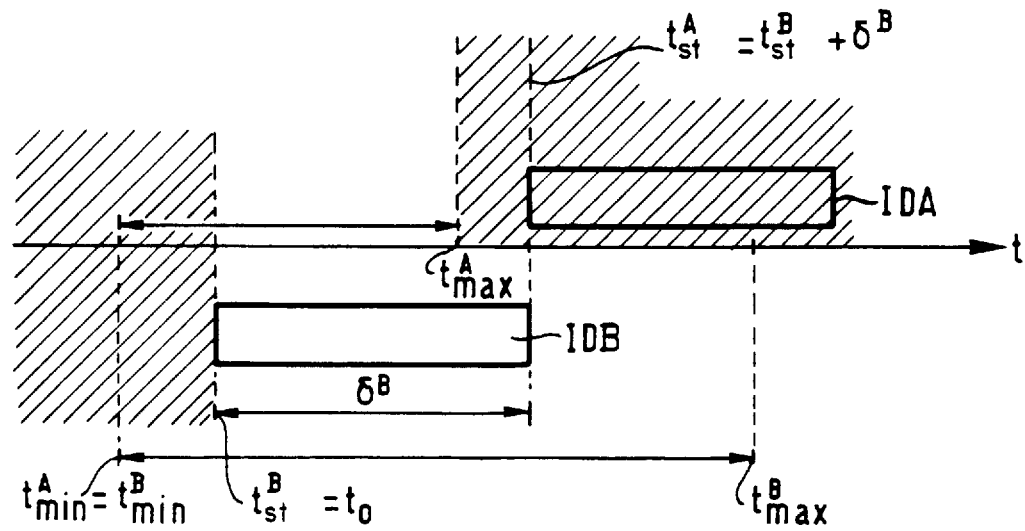

FIG. 12 shows, for the same example, a conflict that is more likely to occur if the second basic principle is not respected. Task B is executed first, from time $t^B_{st}$ which coincides with the end to of the prohibited interval shown by the cross-hatching. Task A must then be executed from a time $t^A_{st} = t^B_{min} + \delta^A$ to prevent the intervals IDA and IDB overlapping, but this time $t^A_{st}$ would then be in a prohibited area, shown cross-hatched in the figure, after the upper limit $t^A_{max}$ of the interval in which execution should start. There is therefore a constraint that is not satisfied. This example shows that failing to respect the second basic principle increases the probability that some constraints will not be satisfied.

Step E2 which schedules the tasks of a layer can be implemented using a known method such as the simplex algorithm. Any other method of scheduling a set of tasks subject to constraints defined for each task by a time interval in which execution of the task must start can be used provided that, in the event of failure, it supplies:

the identity of the task which causes scheduling of the current task to fail;

the direction and amount of the modification of its execution start time needed to remedy the failure, this direction and amount being used thereafter to modify the scheduling in a lower layer in order to modify the interval $[t_{min}, t_{max}]$ for that task.

Figure 13:
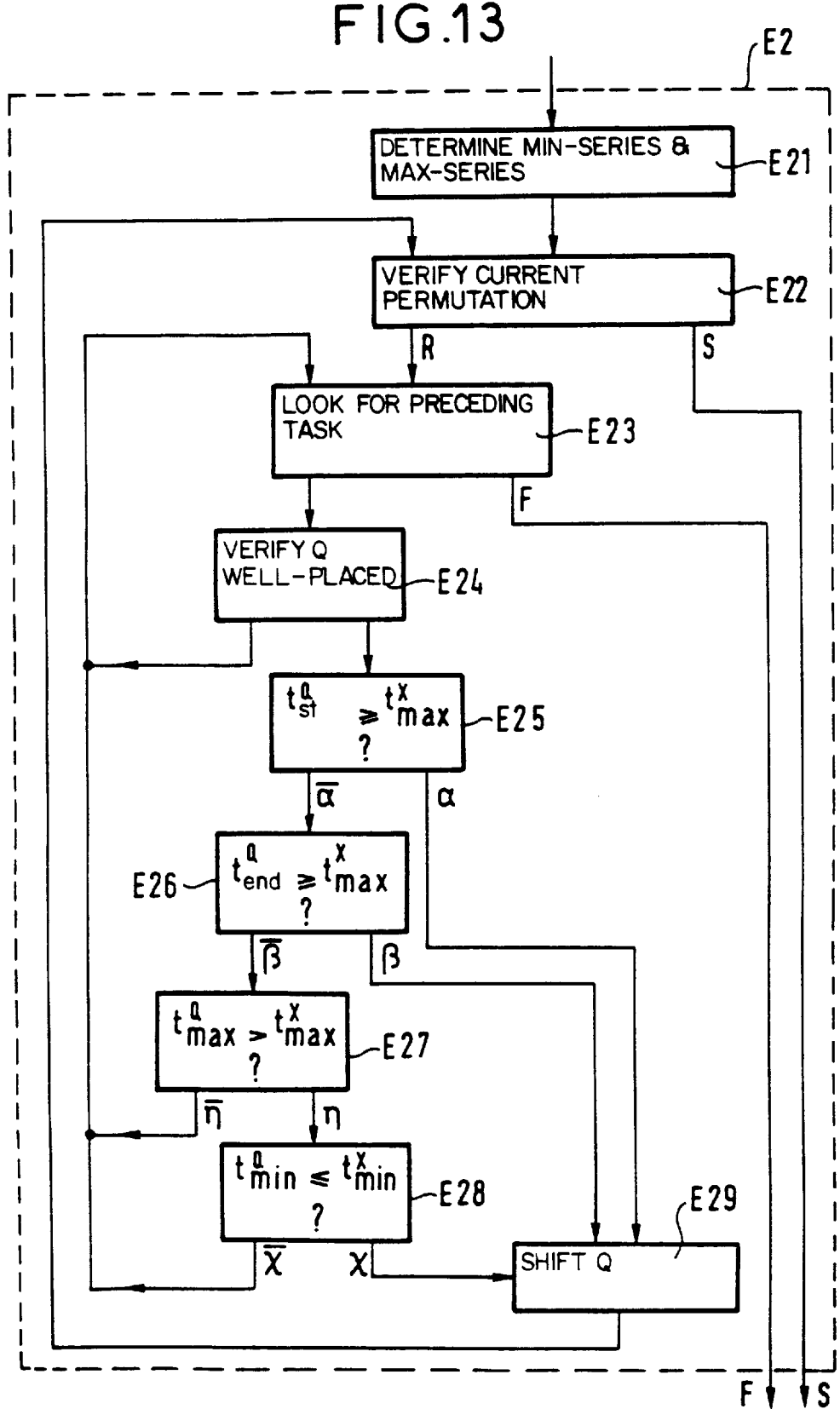
FIG. 13 shows a more detailed flowchart of step E2 of the flowchart shown in FIG. 7, scheduling tasks within a layer of the succession graph.

FIG. 13 shows a flowchart of a preferred embodiment of step E2 of the FIG. 7 flowchart. It starts with a step E21 to determine the series MIN-SERIES comprising all the tasks scheduled in increasing order of their lower limit $t_{min}$. This series will be used to apply the first basic principle stated above. To maximize the probability of finding quickly a permutation that satisfies all the constraints applying to all the tasks of the layer in question, the initial permutation is constituted by MIN-SERIES and the permutations verified thereafter, in the event of failure, are deduced from MIN-SERIES by successive modifications.

Step E21 also determines the series MAX-SERIES comprising all the tasks in the current layer in increasing order of their upper limit $t_{max}$. This series will be used to apply the second basic principle stated above if the initial permutation has to be modified.

The next step E22 verifies the current permutation, i.e. verifies if it satisfies all the constraints applying to the tasks in the current layer. At the beginning of this step the current permutation is the initial permutation determined by step E21.

This verification consists in taking each successive task in the order of the current permutation and verifying that the execution interval [$t_{st}$, $t_{end}$] imposed by the position occupied by that task in the current permutation is compatible with the time interval [$t_{min}$, $t_{max}$] imposed by the constraints that apply to that task. The task for which this verification is in progress is called the current task. If the result of the verification is positive for each of the tasks of the current permutation, this indicates that the current permutation succeeds (S), and scheduling can continue with step E3 of the FIG. 7 flowchart.

If the verification finds at least one task whose position in the permutation imposes starting execution at a time $t_{st}$ that is not in the time interval [$t_{min}$, $t_{max}$] imposed by the constraints, that task is regarded as ill-placed since there is a conflict between two constraints. When step E22 finds a task (X) that is the first ill-placed task in the current permutation, it draws the conclusion (R) that it is necessary to look for a task that is a candidate for shifting to constitute a new permutation. The method then executes a step E23 which looks for the task immediately following the current task X in the series MAX-SERIES. If there is no such task, step E23 fails (F), and scheduling continues with step E3 of the FIG. 7 flowchart.

If step E23 finds a candidate task Q immediately following the current task X in the series MAX-SERIES, the next step E24 of the method verifies that the task Q has already been considered to be well-placed during an earlier step E21. All the tasks considered to be well-placed are those which have a position below that of the current task X, since the verification of step E22 is carried out according to increasing positions in the current permutation. Consequently, step E24 simply verifies that the candidate task Q precedes the current task X in the current permutation. If step E24 determines that the task Q was not considered to be well-placed, then step E23 is repeated to find another candidate task immediately following the task Q in MAX-SERIES.

On the other hand, if the candidate task Q was considered to be well-placed, the next step E25 of the method compares the execution start time $t^Q_{st}$ of the task Q to the upper limit $t^X_{max}$ of the time interval corresponding to the current task X.

If $t^Q_{st} \geq t^X_{max}$, the outcome is that denoted $\alpha$. The next step is then a step E29 which shifts the task Q in the current permutation to insert it between the current task X and the task after the task X in the current permutation. The tasks that were between Q and X, and the task X itself, are shifted one position downwards to fill in the space left free by Q. Consequently, the task Q subsequently occupies the position that was previously that of X. The method then repeats step E22 to verify if the new current permutation obtained in this way satisfies all the constraints. Note that the task Q and all the other tasks that followed it have been shifted. They can no longer be considered to have been well-placed as they do not necessarily satisfy all the constraints in their respective new positions. The tasks below Q retain the same position, and it is therefore not necessary to verify that they satisfy all the constraints applying to them, and therefore the work of verifying those constraints is not done again.

If $t^Q_{st} < t^X_{max}$, the outcome is that denoted $\overline{\alpha}$ (see below) and the next step of the method is step E26.

Figure 14:
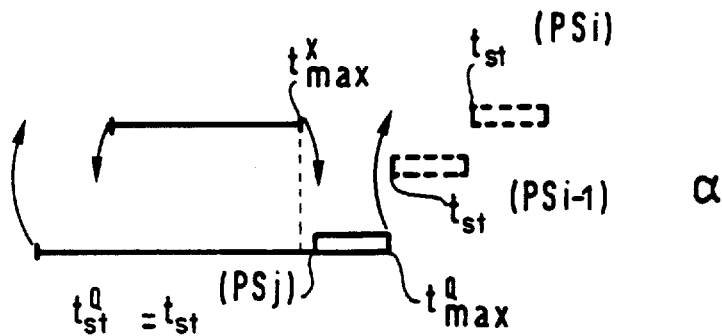
FIGS. 14 through 21 show timing diagrams illustrating use of the flowchart shown in FIG. 11.

FIG. 14 shows the outcome $\alpha$, for example. The execution intervals are shown in dashed outline if a conflict prevents execution and in full outline otherwise.

Consider a task X in position PSi of the current permutation and a task Q considered to be well-placed and in position PSj of the current permutation. The position PSi imposes the start of execution of task X at a time $t_{st}$ (PSi) that is beyond the limit $t^X_{max}$. The position PSj imposes the start of execution of task Q at a time $t_{st}$ (PSj) which in this example is beyond the time $t^X_{max}$. Since the time $t^Q_{st}$ (PSj) is beyond the time $t^X_{max}$, the limit $t^Q_{max}$ is therefore a fortiori greater than or equal to $t^X_{max}$, and therefore has a chance of being near $t_{st}$ (PSi), the ideal being that $t_{st}$ (PSi) falls short of $t^Q_{max}$.

Figure 15:
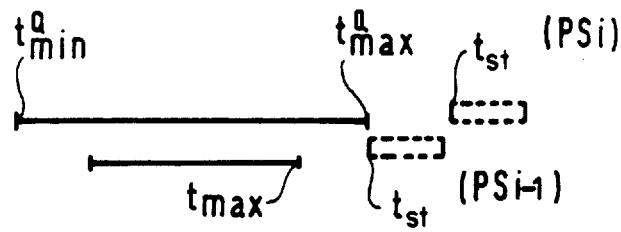

FIG. 15 shows that by shifting the tasks Q and X respectively into the positions PSi–1 and PSj, the probability that the time $t_{st}$ (PSi–1) falls in the interval [$t^X_{min}$, $t^X_{max}$] is greater than the probability that the time $t_{st}$ (PSi) had of falling in this same interval, because $t_{st}$ increases systematically with the position PS. The figure shows that the end $t^X_{max}$ of the segment corresponding to task X has moved closer to an execution interval, namely that which starts at $t_{st}$ (PSi–1), and therefore has a greater chance of intersecting with that interval.

The end $t^Q_{max}$ of the segment corresponding to the task Q has a non-null chance of intercepting the rectangle representing the execution interval starting at time $t_{st}$ (PSi). Consequently, the new permutation has a greater chance than the old one of satisfying all the constraints and it is therefore beneficial to try out this new permutation. In the example shown, $t_{st}$ (PSi–1) is beyond $t_{max}$ and there is therefore still a conflict in respect of the task X. It is therefore necessary to make one or more further modifications to the current permutation.

In this example, $t_{st}$ (PSi) is beyond $t^Q_{max}$ and there is therefore also a conflict in respect of the task Q after the shift. However, in other examples corresponding to the outcome $\alpha$ it may be that the constraints applying to X and those applying to Q are satisfied simultaneously. Consequently, it is beneficial to verify any new permutation corresponding to the outcome $\alpha$.

In the case of the outcome $\overline{\alpha}$, on the other hand, further verifications are needed before it is possible to conclude that the task Q is a worthwhile candidate task. The next step of the method is then step E26 that compares the time $t^Q_{end}$ of end of execution of the task Q to the upper limit $t^X_{max}$, of the interval in which execution of the task X must start. If $t^Q_{end} \geq t^X_{max}$, the outcome is that denoted $\beta$ and the next step of the method is the step E29 which shifts the task Q to insert it after the task X. The contrary outcome is that denoted $\overline{\beta}$. Other verifications are needed before it is possible to conclude that the task Q is a worthwhile candidate task.

Figure 16:
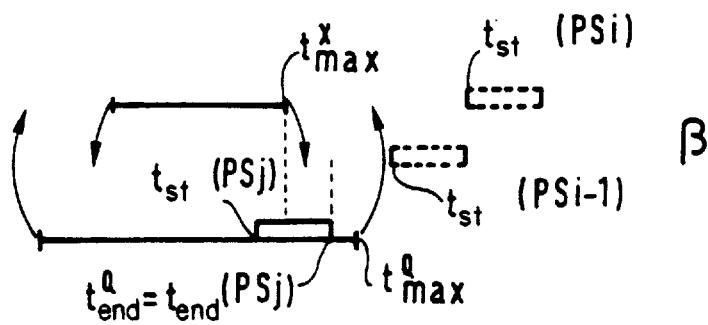
Figure 17:
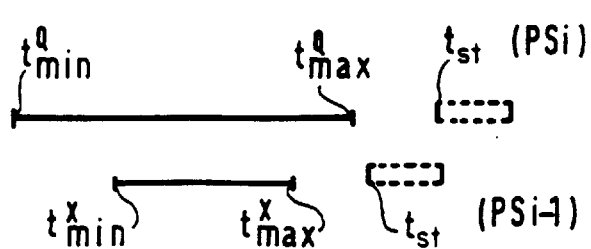

FIGS. 16 and 17 show the outcome $\beta$. FIG. 16 shows a task X in the position PSi and a task Q in the position PSj such that the outcome $\overline{\alpha}$ and the outcome $\beta$ apply: the time $t^Q_{end}$ of end of execution of the task Q, i.e. the time $t_{end}$ (PSj) imposed by the position PSj of Q in the current permutation, is beyond the time $t^X_{max}$.

FIG. 17 shows that by displacing the tasks Q and X to the positions PSi–1 and PSj, respectively, the probability that the time $t_{st}$ (PSi–1) falls in the interval [$t^X_{min}$, $t^X_{max}$] is greater than the probability that the time $t_{st}$ (PSi) had of falling in that same interval, because $t_{st}$ increases systematically with the position PS. What is more, the time $t^Q_{end}$ =$t_{end}$ (PSj) is beyond the limit $t^X_{max}$, and there is no conflict. This means that $t^Q_{max}$ is either greater than $t^X_{max}$ or slightly less than $t^X_{max}$, being at most at a distance equal to the interval [$t_{st}$ (PSj), $t_{end}$ (PSj)]. There is therefore little chance that $t^Q_{max}$ is greater than $t^X_{max}$, and therefore in this case there is little chance that $t^Q_{max}$ will be beyond $t_{st}$ (PSi) after the shift. It is therefore worthwhile to try out a permutation corresponding to the outcome $\beta$, which will not necessarily be a waste of time.

In the example shown in FIG. 17, the shifting of Q and X is not sufficient for all the constraints on Q and X to be satisfied. The current permutation needs to be modified a little more.

In the case of the outcome $\bar{\beta}$, step E27 compares the upper limit $t^Q_{max}$ of the time interval in which execution of task Q must start to the upper limit $t^X_{max}$ of the time interval in which execution of task X must start. If $t^Q_{max} > t^X_{max}$, the outcome is denoted η and the next step of the method is then a step E28. The contrary outcome is that denoted $\bar{\eta}$ and step E23 is then repeated since there is no chance that the candidate task Q is worthwhile.

Figure 18:
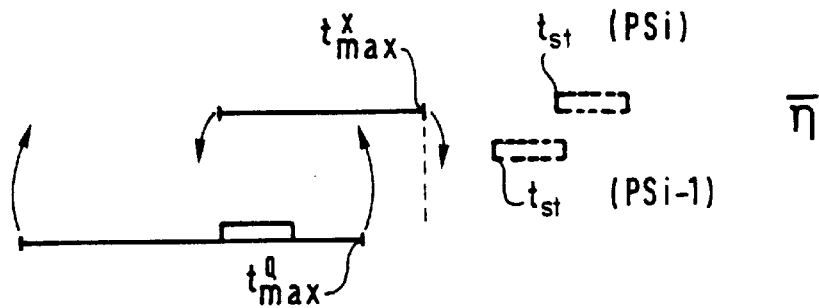
Figure 19:
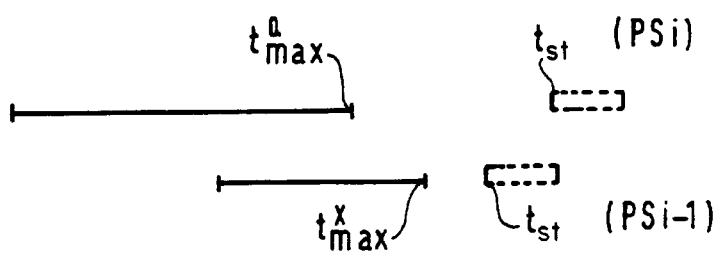

FIGS. 18 and 19 show the outcome $\bar{\eta}$ by means of an example in which the limit $t^Q_{max}$ is before the time $t^X_{max}$.

FIG. 18 shows the tasks X and Q shifted into the positions PSi−1 and PSi, respectively. This figure shows that the time $t^Q_{max}$ is closer to the time $t_{st}$ (PSi) than it was to the time $t_{st}$ (PSj) but there is no chance of the task Q being executed since $t^Q_{max}$ is still farther from $t_{st}$ (PSi) than $t^Q_{max}$ was. Since there is a 100% chance of the task Q being ill-placed, it is not worthwhile to attempt any modification of the current permutation and for this reason the next step of the method is a step E23 that looks for another candidate task for shifting.

In the case of outcome η, step E28 compares the lower limit $t^Q_{min}$ of the interval in which execution of task Q must start with the lower limit $t^X_{min}$ of the time interval in which the execution of task X must start.

The objective of this step E28 is to verify that the task Q is before the current task X in the series MIN-SERIES so that the task Q can be moved after the task X. Otherwise (outcome $\bar{\alpha}$) the next step of the method is a step E23 that looks for another task that is a candidate for shifting.

In the case of the outcome χ, the next step of the method is a step E29 that shifts the task Q after the task X; step E22 is then repeated to verify if all the constraints applying to the tasks of the current layer are satisfied.

Figure 20:
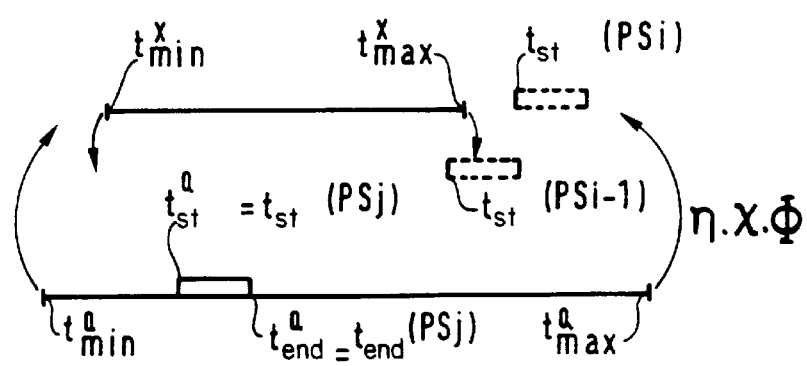

FIG. 20 shows an example in which the outcomes α, β, χ, η apply simultaneously.

Figure 21:
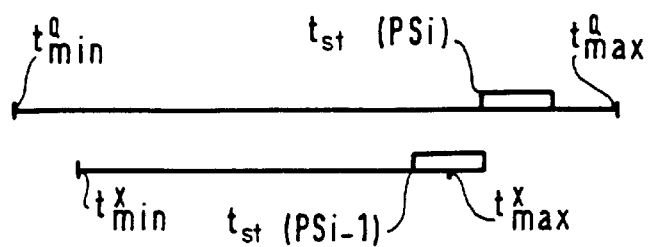

FIG. 21 shows the tasks X and Q shifted into the positions PSi−1 and PSi, respectively, in an example in which the constraints are such that they are satisfied after this shifting: $t_{st}$ (PSi) is in the interval $[t^Q_{min}, t^Q_{max}]$ and $t_{st}$ (PSi−1) is in the interval $[t^X_{min}, t^X_{max}]$.

FIGS. 22 through 31 show the implementation of step E2 for scheduling a layer comprising thirteen tasks: A, B, C, D, E, G, J, K, L, N, P, S, T.

Figure 22:
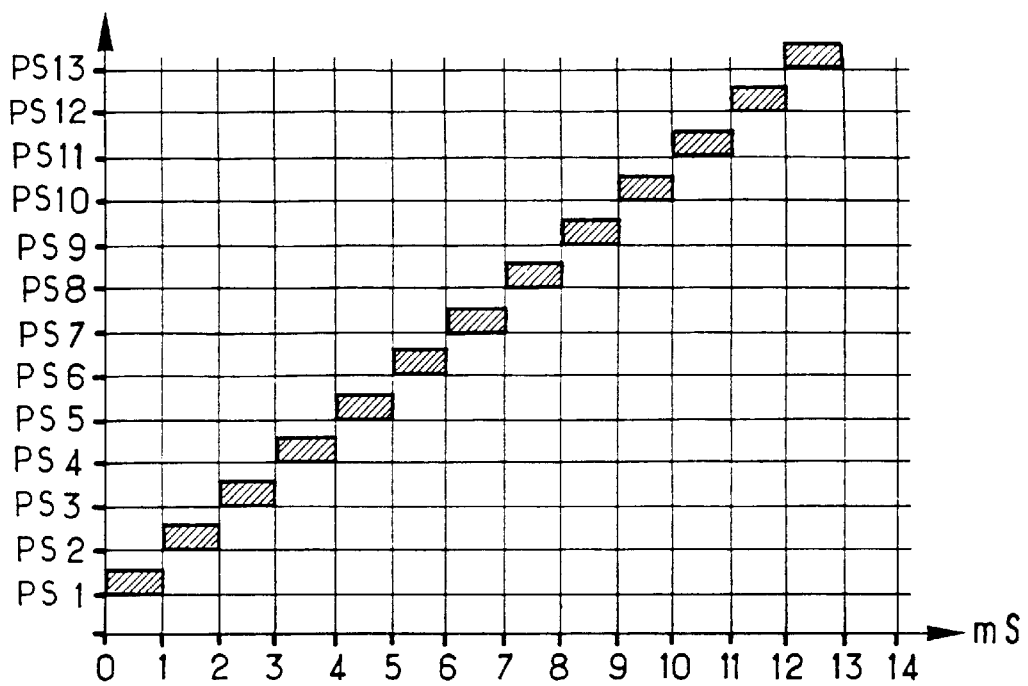
FIGS. 22 through 31 show one example of the use of the flowchart shown in FIG. 13 to schedule a layer.

FIG. 22 shows on a time scale from 0 to 14 ms the position of the execution intervals respectively corresponding to thirteen positions PS1 through PS13. The tasks are executed in the order of the positions PS1 through PS13 and each execution interval has a duration equal to 1 ms.

Each task must satisfy one or more constraints that result in a single constraint. The start of the execution interval (cross-hatched rectangle in FIG. 22) must be in a given time interval (bold segments in FIG. 23). In the worst case it can begin at the upper limit.

Step E21 determines the series MIN-SERIES comprising all the tasks of the current layer scheduled in increasing order of their lower limit $t_{min}$.

MIN-SERIES=N, J, S, D, E, B, T, A, K, P, L, C, G.

Figure 23:
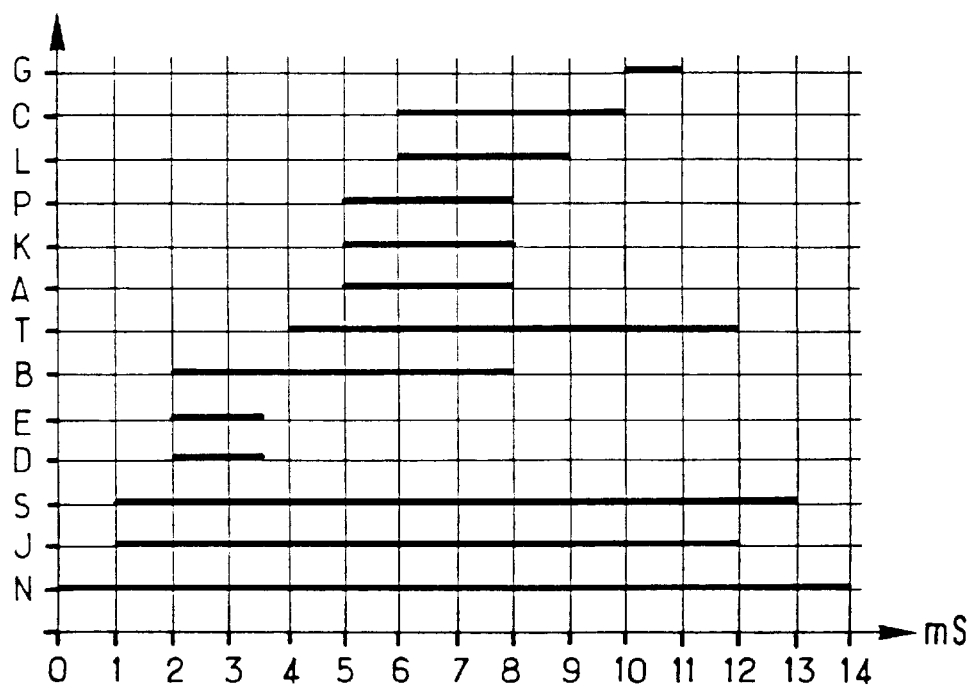

In FIG. 23 the thirteen tasks are shown in the same order as MIN-SERIES, along the ordinate axis. To maximize the probability of quickly finding a permutation that satisfies all the constraints applying to the tasks of the layer in question, the so-called initial permutation verified first is that consisting of MIN-SERIES, and those verified thereafter, in the event of failure, are deduced from MIN-SERIES by successive modifications.

Step E21 further determines the series MAX-SERIES comprising all the paths of the current layer scheduled in order of increasing $t_{max}$ values. This series will be used to apply the second basic principle stated above if the initial permutation has to be modified. In this example:

MAX-SERIES=E, D, A, K, P, B, L, C, G, T, J, S, N.

A step E22 then verifies the current permutation, i.e. verifies if it satisfies all the constraints applying to the tasks of the layer in question. At the start of step E2 the current permutation is the initial permutation determined by step E21.

The verification is performed successively for each task, in the order of the current permutation: N, J, S, D, E, . . . , G. If the result of the verification is positive for a task, that task is considered to be well-placed in the permutation, but its position can be called into question again subsequently if this is needed to satisfy other constraints.

Comparing FIGS. 22 and 23 shows that there is no problem in executing the tasks N, J, S and D, respectively, during the execution intervals shown in FIG. 22. They are therefore all considered to be well-placed, the current permutation is:

N, J, S, D, E, B, T, A, K, P, L, C, G.

The tasks underlined are those considered to be well-placed.

Figure 24:
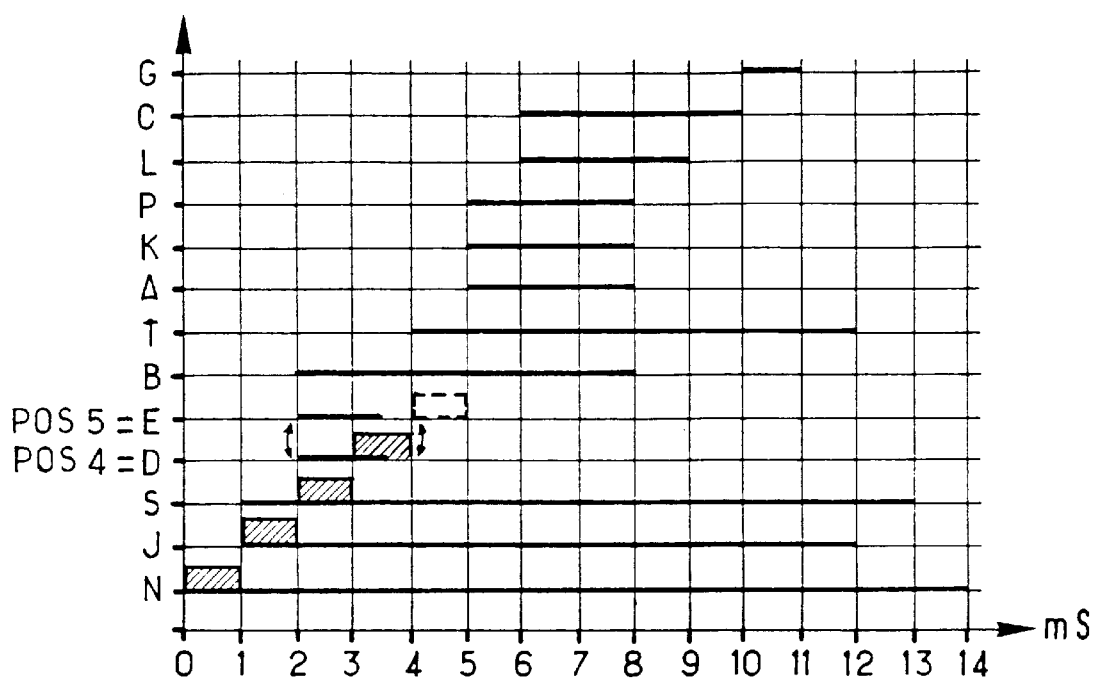

FIG. 24 shows the first conflict encountered in verifying the initial permutation. Cross-hatched rectangles in FIG. 24 represent execution intervals for which there is no conflict between the constraint and a dashed outline black rectangle shows the execution interval that is causing a conflict. It corresponds to the position PS5 currently occupied by the task E. This execution interval does not intersect the interval in which the execution of the task E must start. Step E23 therefore looks in the series MAX-SERIES for a task following the task E, i.e. such that the limit $t_{max}$ has a higher value.

MAX-SERIES=E, D, A, K, P, B, L, C, G, T, J, S, N.

Step E23 finds the task D. Step E24 verifies that it is considered to be well-placed, by verifying that its position is below the position of the current task E in the current permutation. Step E25 then arrives at a conclusion $\bar{\alpha}$. Step E26 then arrives at a conclusion β. Step E29 then shifts D into the position POS5 and E moves back into the position POS4. Step E22 verifies that the constraints applying to E and the subsequent tasks are satisfied but finds that the constraint applying to D are no longer satisfied. The permutation tried out is not suitable. It is not retained at the new current permutation.

FIG. 24 shows that this modification cannot succeed because the interval corresponding to D has an upper limit which is not higher than that of the interval corresponding to E. They are in fact exactly the same. To prevent unnecessary verification of new permutations it is possible to take precautions when constructing MAX-SERIES during step E21:

If two tasks of the same layer have a common time interval constraint $[t_{min}, t_{max}]$, it is possible to put them in two different positions in the series MIN-SERIES that constitutes the initial permutation and in the series MAX-SERIES. In the example shown in FIGS. 22 through 31 there are at least two possibilities for constructing the series MAX-SERIES since it is possible to permutate D and E:

D, E, A, K, P, B, L, C, G, T, J, S, N or

E, D, A, K, P, B, L, C, G, T, J, S, N.

It would have been preferable to choose the order D, E that is the opposite of the order E, D in which they are taken to constitute the initial permutation.

MIN-SERIES=N, J, Si D, E, B, T, A, K, P, L, C, G.

Step E23 then finds as successive candidate tasks the tasks A, K, P, B, L, C, G, T, J and step E24 retains task J.

It can be shown that, as a general rule, if the tasks of the layer to be scheduled have to satisfy only timing constraints, it is preferable to place in a reverse order all the tasks having the same interval $[t_{min}, t_{max}]$ regardless of their number. On the other hand, if both timing constraints and sequence constraints apply, it is preferable to place them in the same order.

Consider the remainder of this example, retaining the initial choice of MAX-SERIES:

E, D, A, K, P, B, L, C, G, T, J, S, N.

The current permutation is:

N, J, S, E, D, B. T, A, K, P, L, C, G.

After this unfortunate attempt to modify the permutation, step E23 finds as successive candidate tasks the tasks A, K, P, B, L, C, G, T and these are rejected by step E24. Step E23 then finds task J.

Figure 25:
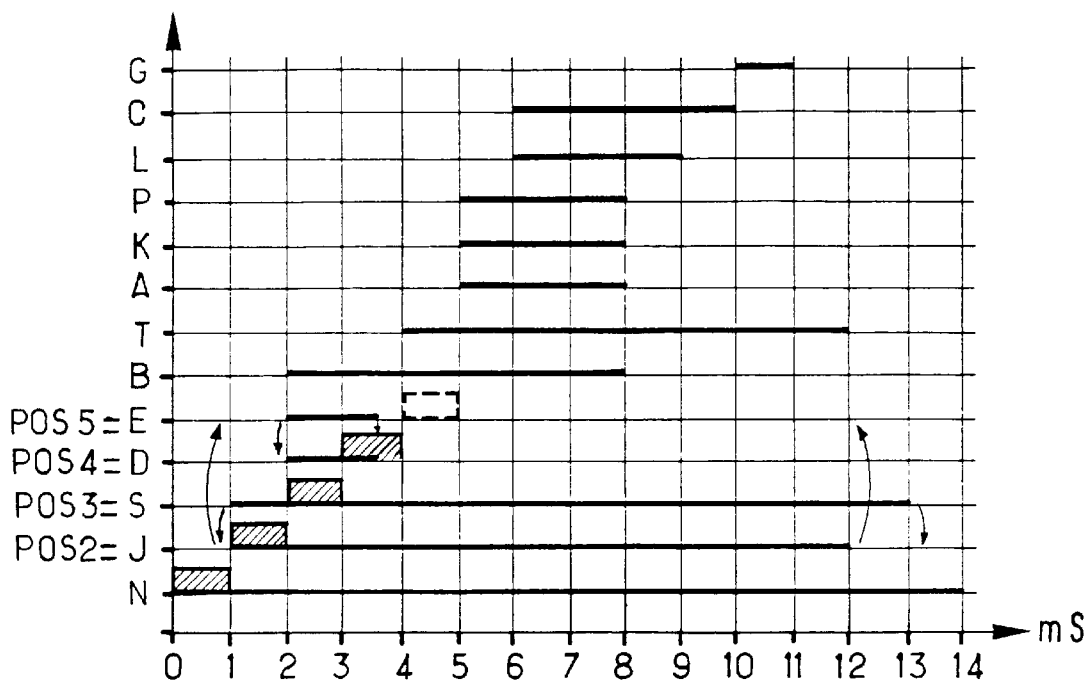

FIG. 25 shows this new attempt at modification. Step E24 verifies that task J is considered to be well-placed. Step E25 reaches the conclusion $\overline{\alpha}$. Step E26 reaches the conclusion $\overline{\beta}$. Step E27 and E28 arrive at the conclusions η and χ. Consequently step E29 places task J in position PS5 in place of E. Task E, D and S move back one place: S to position PS2, D to position PS3 and E to position PS4. The other tasks do not change place.

Step E22 then verifies that the tasks that have been shifted satisfy all the constraints applying to them, starting with the shifted task in the lowest position: S, then E, then D, then J. It then verifies that there is no conflict between the successive constraints for tasks B, T, A, K.

Figure 26:
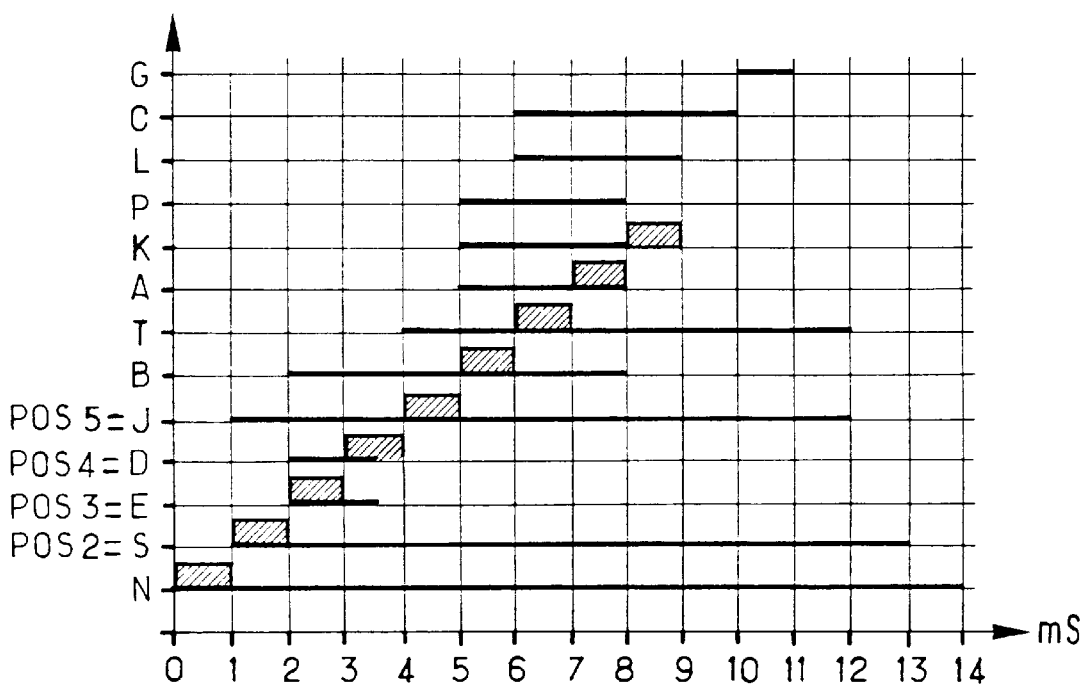

FIG. 26 shows the new current permutation. Note that the execution interval for task K starts at the exact time which is the end of the interval in which execution of task K should start. There is no conflict, but the constraints are satisfied. The current permutation is:

N, S, E, D, J, B, T, A, K, P, L, C, G.

Figure 27:
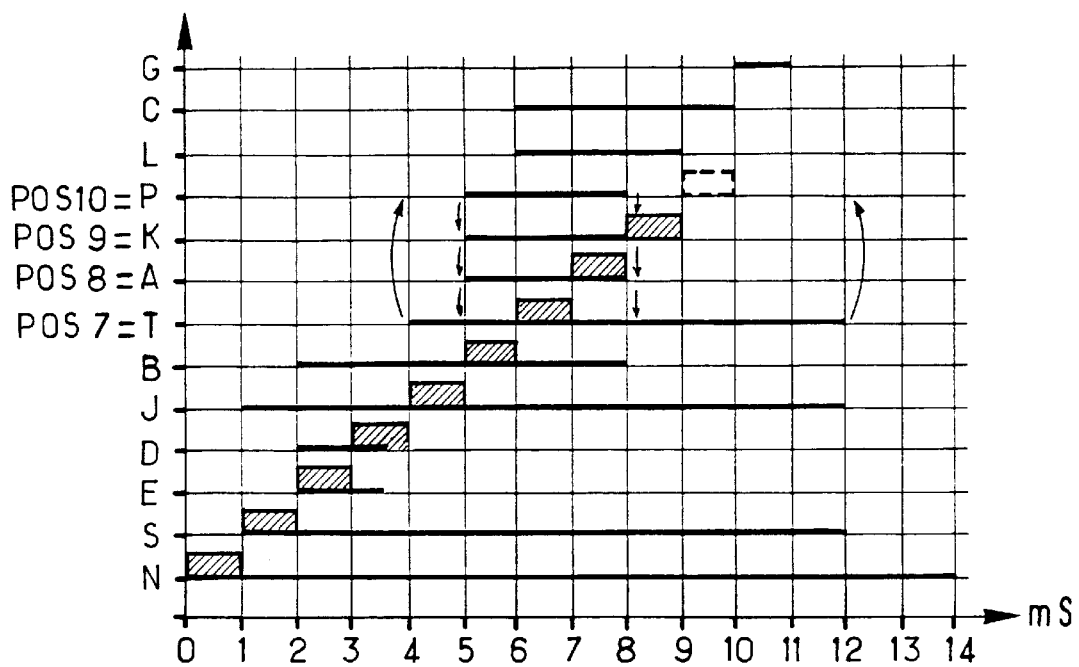

FIG. 27 shows that a conflict occurs for task P. Step E23 is then repeated to determine in the series MAX-SERIES the task immediately following the task P. It finds task B. Step E24 verifies that task B is considered to be well-placed. Steps E25 and E26 reach conclusions $\overline{\alpha}$ and then $\overline{\beta}$. Step E27 is then executed. This finds that $t^B_{max} = t^P_{max}$ and consequently arrives at the conclusion $\overline{\eta}$. Step E23 is then repeated to find another candidate task in the series MAX-SERIES. The segment representing the time interval corresponding to B would not intersect with the execution interval [9 ms, 10 ms] corresponding to the position POS10 if task B were shifted to that position. Consequently, the constraints that apply to B would not be satisfied.

Step E23 then finds the successive tasks L, C, G but step E24 rejects them as they are not considered to be well-placed in the permutation. Finally, steps E23 and E24 find task T. Steps E25 through E28 successively arrive at the conclusions $\overline{\alpha}$, $\overline{\beta}$, η, χ. Step E29 shifts T to position POS10. Tasks P, K, A move back into positions POS9, POS8, POS7, respectively.

Step E22 then verifies that the constraints applying to the shifted tasks A, K, P, T and the subsequent tasks are satisfied. The new current permutation is:

N, S, E, D, J, B, A, K, P, T, L, C, G.

Figure 28:
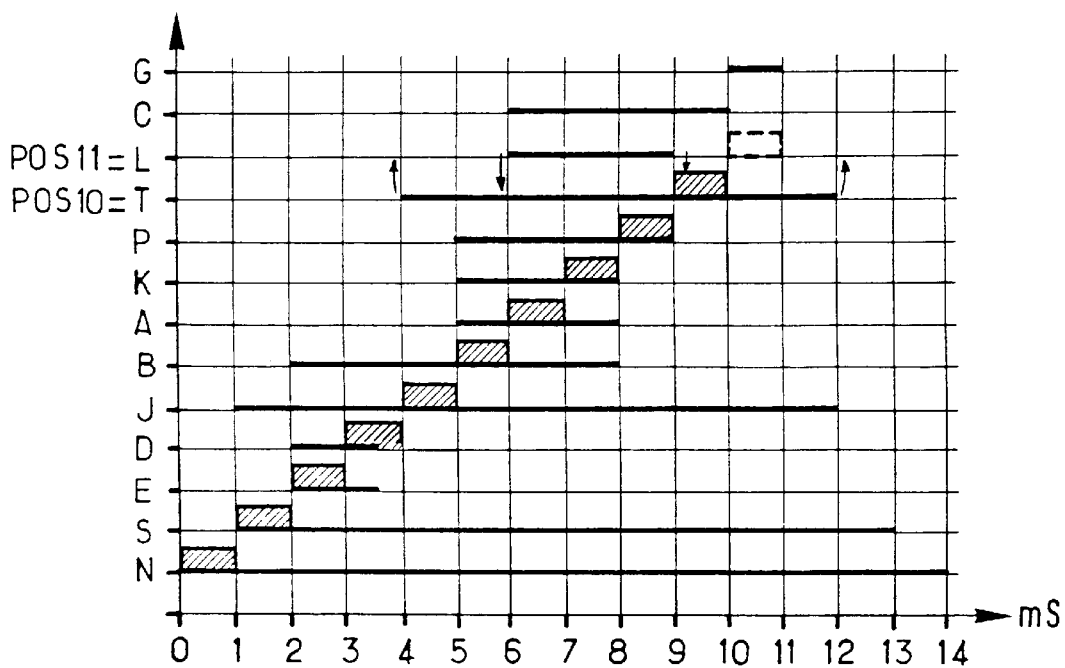

As shown in FIG. 28, step E22 then finds that the constraints applying to task L are not satisfied.

Step E23 then finds task T and step E24 verifies that it is considered to be well-placed. Step E25 and the subsequent steps can then be executed. They arrive at conclusions $\overline{\alpha}$, $\overline{\beta}$ then η and χ. Step E29 can then be executed. It places task T in the position POS11 that was occupied by task L, which moves back one place. Step E22 verifies that the constraints applying to the shifted tasks L and T are satisfied. Consequently, the current permutation becomes:

N, S, E, D, J, V, A, K, P, L, T, C, G

Figure 29:
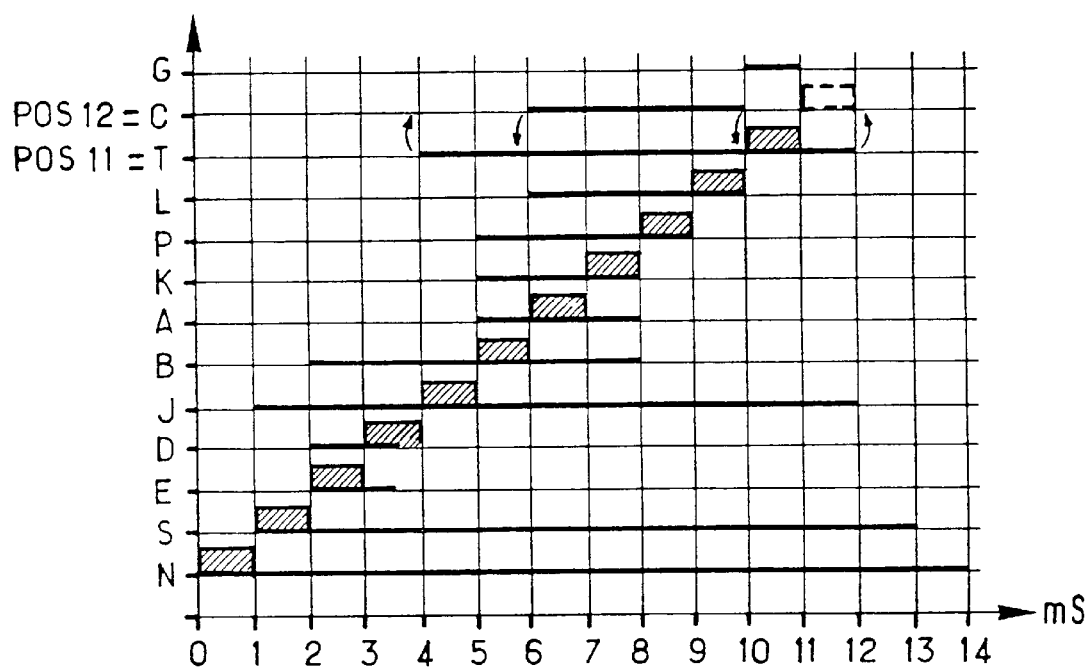

As shown in FIG. 29, there is a conflict between the constraints applying to task C. Step E23 determines the task following task C in the series MAX-SERIES. It finds task G but step E24 finds that task G is not considered to be well-placed in the permutation. Step E23 is repeated and determines another task T preceding task C in the series MAX-SERIES. Step E24 verifies that task T is considered to be well placed in the permutation. Step E25 arrives that the conclusion α since $t^T_{st} = t^C_{max}$. Step 29 is therefore executed immediately and places task T after task C in the permutation, which is the same thing as permutating the positions of C and T. Step E22 then verifies that all the constraints applying to the shifted tasks C and T are satisfied.

The new current permutation is:

N, S, E, D, J, L, A, K, P, L, C, T, G.

Figure 30:
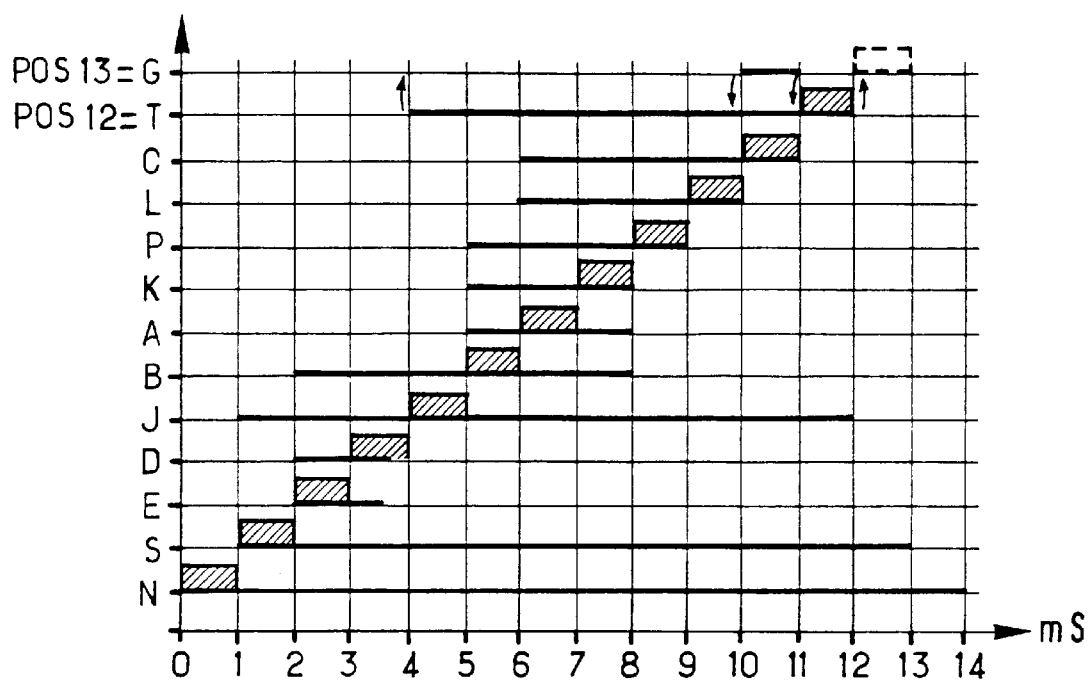

As shown in FIG. 30, step E22 finds that there is a conflict between the constraints applying to task G. Step E23 determines a task T immediately following task G in the series MAX-SERIES. Step E24 verifies that task T is considered to be well-placed in the permutation. Step E25 arrives at the conclusion α since $t^T_{st} = t^G_{max}$. Step E29 places T after G in the permutation, which is the same thing as permutating T and G. Step E22 then verifies that all the constraints applying to the shifted tasks G and T are satisfied. The new current permutation is:

N, S, E, D, J, B, A, K, P, L, C, G, T.

Figure 31:
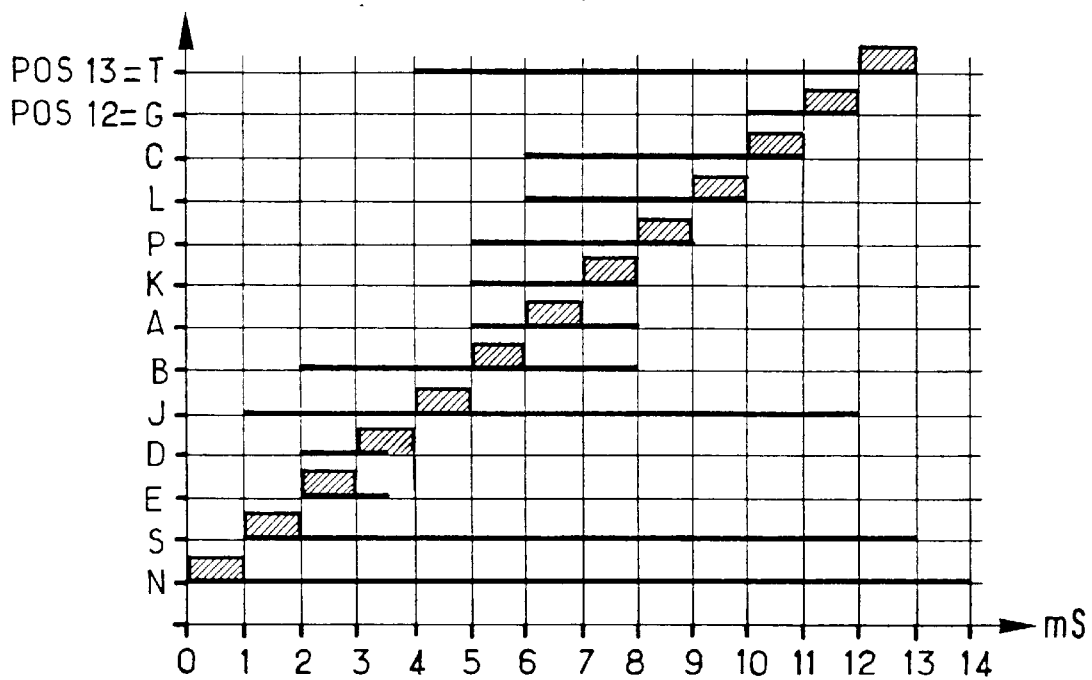

All the tasks are considered to be well-placed because all the constraints are satisfied, as shown in FIG. 31, and consequently step E22 succeeds (S). If there are other, higher layers, they are scheduled by step E3 of the FIG. 7 flowchart. Although the invention has been illustrated and described with respect to an exemplary embodiment thereof, it should be understood by those skilled in the art that the foregoing and various other changes, omissions, and additions may be made therein and therefor, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

There is claimed:

1. Method of scheduling successive and repetitive tasks, using a computer, where each task has a respective start time interval and some tasks must satisfy constraints requiring the task's respective execution start time to be within a predetermined time interval relative either to the execution start time of a predecessor task, execution of which precedes that of the task in question, or to an absolute reference time, said method comprising the steps of:

determining a macrocycle time interval, the duration of which is equal to the lowest common multiple of all said task start time intervals;

reducing the macrocycle time interval to a microcycle, or layer, the duration of which is equal to the highest common denominator of all the task repeat periods;

grouping each of said tasks into a respective layer in accordance with time sequences imposed by said constraints;

and scheduling the tasks of a macrocycle layer by layer, beginning with the first layer in time of the macrocycle, where said scheduling comprises repeating the following steps:

scheduling all tasks in a current layer, where said current layer is a layer immediately following a last scheduled layer;

determining if task scheduling for said current layer is possible given said constraints of said tasks in said current layer;

if said task scheduling is not possible for said current layer, determining if said current layer is said first layer in time;

if no scheduling of the first layer in time satisfies all said constraints applying to the tasks of the first layer, stopping scheduling and providing notification of scheduling failure and;

if the scheduling effected in said current layer, that is not said first layer in time, does not satisfy one or more constraints applying to a task of the current layer:

rescheduling the last layer in time of those layers containing the respective predecessor tasks corresponding to the unsatisfied constraints of said tasks within said current layer by shifting the execution time of the predecessor task contained in that last layer in a direction and by an amount such that the unsatisfied constraint can be satisfied on subsequent rescheduling of said current layer; and rescheduling said last layer in time and all other layers following it in time and then deciding whether the resulting rescheduling succeeds.

2. Method according to claim 1 comprising the following steps in this order for scheduling each current layer:

calculating for each task of said current layer upper and lower limits of the time interval in which execution of that task must start;

constructing a first series in which all said tasks of the current layer are scheduled in increasing order of their lower limit, and are scheduled in increasing order of their upper limit when several tasks have a same lower limit;

constructing a second series in which all said tasks of the current layer are scheduled in increasing order for their upper limit, and are scheduled in decreasing order of their lower limits when several tasks have a same upper limit and have different lower limits;

constructing a current permutation, first by scheduling all said tasks of the current layer in the order of said first series;

verifying if said current permutation satisfies all said constraints applying to said tasks of the current layer, the tasks being considered one by one in the order corresponding to said current permutation, to check whether each task satisfies all the constraints applying to said task;

deciding that the scheduling of the current layer succeeds if all said constraints are satisfied;

otherwise, determining in the said current permutation the first so-called ill-placed task for which a constraint is not satisfied;

determining in said second series a so-called candidate task immediately following said ill-placed task in said second sequence and which also precedes said ill-placed task in said current permutation, said candidate being a task which has already been verified, all the tasks following said candidate task in said current permutation being not considered as satisfying all the constraints, any more;

verifying that, if said candidate task is shifted to be immediately after said ill-placed task, all said constraints applying to all said tasks shifted in this way are then satisfied; and if at least one constraint is not satisfied, deciding that said candidate task is not suitable, then determining in said second sequence another candidate task and repeating the previous verification; and, if this is not possible, deciding that the scheduling of the current layer fails;

if all said constraints are satisfied, deciding that the scheduling of the current layer succeeds.

* * * * *